US008027534B2

(12) United States Patent
Ono

(10) Patent No.: US 8,027,534 B2
(45) Date of Patent: Sep. 27, 2011

(54) IMAGE PROCESSING APPARATUS, IMAGE PROCESSING METHOD, AND PROGRAM

(75) Inventor: Hiroaki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 1098 days.

(21) Appl. No.: 11/797,792

(22) Filed: May 8, 2007

(65) Prior Publication Data
US 2007/0269135 A1 Nov. 22, 2007

(30) Foreign Application Priority Data

May 8, 2006 (JP) ............... P2006-129092
Jul. 13, 2006 (JP) ............... P2006-193435

(51) Int. Cl.
*G06K 9/00* (2006.01)
(52) U.S. Cl. ................ 382/172
(58) Field of Classification Search .......... 382/164–165, 382/170–173, 176, 180–181, 190, 199, 205, 382/218–222, 254, 256, 266, 269, 282, 284, 382/294; 348/129, 161, 345, 352, 365, 370; 358/450, 453, 464, 465, 466, 540
See application file for complete search history.

(56) References Cited

U.S. PATENT DOCUMENTS

| 4,233,631 | A | 11/1980 | Mahler | |
|---|---|---|---|---|
| 6,335,985 | B1 * | 1/2002 | Sambonsugi et al. | 382/190 |
| 6,636,635 | B2 * | 10/2003 | Matsugu | 382/218 |
| 7,366,360 | B2 * | 4/2008 | Takiguchi et al. | 382/284 |

FOREIGN PATENT DOCUMENTS

| JP | 09-073541 | 3/1997 |
|---|---|---|
| JP | 10-290450 | 10/1998 |
| JP | 2003-179930 | 6/2003 |
| JP | 2004-186994 | 7/2004 |
| JP | 2005-123824 | 5/2005 |

OTHER PUBLICATIONS

J. Assa et al., "Action Synopsis: Pose Selection and Illustration", ACM Transactions on Graphics, ACM, vol. 24, No. 3, pp. 667-676, XP040023275 (2005).
A. H. S. Lai, et al., "A Fast and Accurate Scoreboard Algorithm for Estimating Stationary Backgrounds in an Image Sequence", Circuits and Systems, Proceedings of the 1998 IEEE International Symposium on Monterey, California (U.S.), pp. IV-241-IV-244, XP010289524 (1998).
European Search Report in EP 07 25 1786, dated Jun. 18, 2010.

* cited by examiner

*Primary Examiner* — Jose Couso
(74) *Attorney, Agent, or Firm* — Finnegan, Henderson, Farabow, Garrett & Dunner, L.L.P.

(57) ABSTRACT

An image processing apparatus comprising: background generation means for generating, on each of corresponding pixel positions of more than one input image, a pixel value involved in a predetermined distribution among pixel values of the input images as a background pixel value in the pixel position; degree-of-difference generation means for generating, on each of the pixel positions, a degree-of-difference indicating a degree to which each input image pixel value has a difference from the background pixel value; and output image generation means for generating, on each of the pixel positions, an output image pixel value by reflecting the input image pixel values depending on the degree-of-difference.

20 Claims, 23 Drawing Sheets

F I G . 8
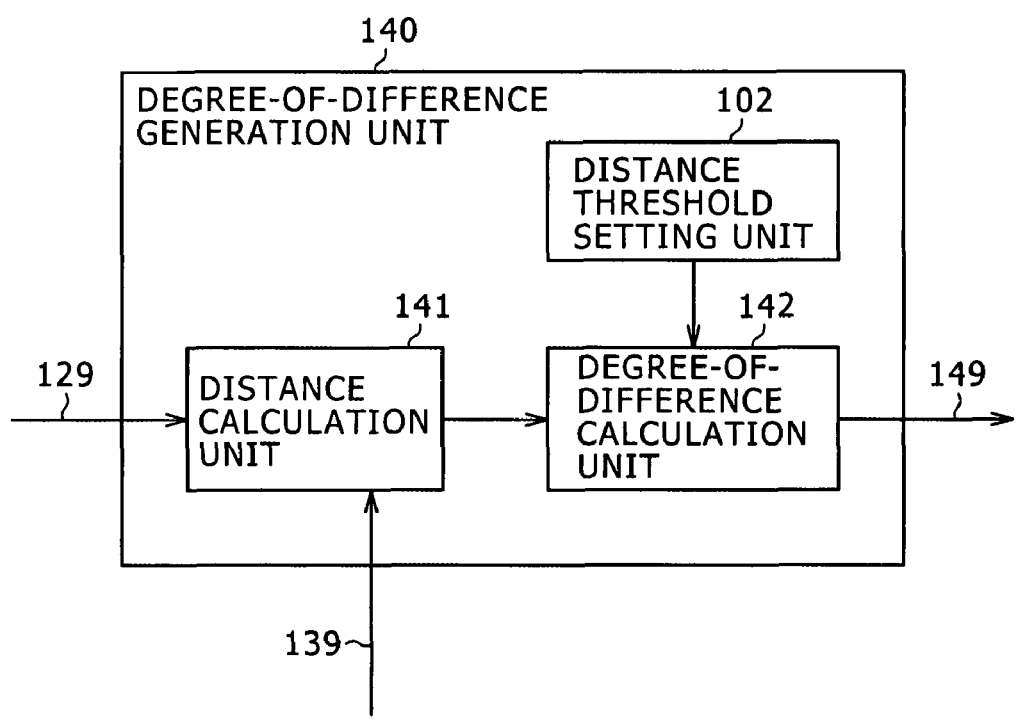

IMAGE PROCESSING APPARATUS, IMAGE PROCESSING METHOD, AND PROGRAM

BACKGROUND OF THE INVENTION

1. Field of the Invention

The present invention relates to an image processing apparatus, more particularly, an image processing apparatus that displays a locus involved in an image provided by being imaged in time series, an image processing method thereof, and a program adapted for a computer to perform the method.

2. Description of Related Art

Simple synthesis of more than one image (which is hereinafter referred to as a frame image) by overlapping, for instance, is suggested as one method for generating an image indicative of a moving object locus from more than one frame image provided by being imaged in time series. According to the simple synthesis of this type, a rate of single frame contribution to a synthesis result decreases as the number of frames is increased, causing a problem that the moving object locus displayed becomes light-colored. When assuming that there are five frame images as shown in FIG. 10, for instance, the synthesis simply made on these frame images causes the rate of each pixel contribution to the synthesis result to decrease down to 20%. And, in a pixel position at which a moving object traverses, the synthesis is provided in a moving object-to-background ratio of 20:80, leading to an occurrence of light-colored display of the moving object locus as shown in FIG. 11C.

On the other hand, one technique provided by making improvements on the simple synthesis is suggested to synthesize a single still image by, after extracting more than one frame image from video data, giving weighting suited for a luminance value (See Japanese Patent Application Publication Hei. 10-290450 (FIG. 1), for instance). The technique according to this related art provides the synthesis on same positional pixels involved in each frame image by heavily weighting the pixels that are away from a mean luminance value by a distance or more of a dispersion of the luminance values, while lightly weighting the pixels that are away from the mean luminance value by the distance or less of the above dispersion, followed by output of the synthesis result as the same positional pixels of an output image. This technique ensures that in a synthesized image, the moving object is more heavily weighted than a background, causing the moving object locus to be displayed more clearly, as compared with the simple synthesis.

In addition, one different technique is suggested to provide the synthesis of the moving object locus by extracting and tracing the moving object (See Japanese Patent Application Publication 2005-123824 (Refer to FIG. 1), for instance). The technique according to this related art ensures that an enhanced accuracy of extraction and tracing of the moving object is obtained by, when the tracing of the moving object results in a failure, interpolating the moving object based on a moving object characteristic amount and/or position provided at the time of successful tracing.

SUMMARY OF THE INVENTION

The synthesis with the moving object heavily weighted, like the method according to the above-described related arts, has an effect of permitting the moving object locus to be displayed more clearly, as compared with the simple synthesis. However, equal weighting is attributed to multiple synthesis except in the background, so that the rate of single frame contribution to the locus decreases as the number of frame images other than the background is increased, in which case, it is difficult to create the locus as clearly displayed as an original image. In addition, a method for judging the background based on the dispersion of the luminance values sometimes has difficulty in making clear distinctions between the background and the other depending on a condition of the image.

Further, the technique according to the related art of a type that involves the tracing of the moving object permits the locus to be displayed in an arbitrary fashion, while making interpolations of the moving object. However, in this case, moving object characteristics such as region of existence, color, luminance and texture are used as the characteristic amount, so that a problem of being inadaptable for a change and/or a transformation of these characteristics is caused. Further, a presence of a large number of moving objects gives rise to a problem of getting into difficulty in tracing all the moving objects from a viewpoint of a cost taken for an arithmetic operation etc.

The present invention is intended to generate a locus-synthesized image of a moving object from more than one frame image provided by being imaged in time series, without being affected by a condition of a background in the frame image and/or moving object characteristics such as number, size, transformation and color.

The present invention has been undertaken in order to solve the above problems, and its first aspect is to provide an image processing apparatus having background generation means; degree-of-difference generation means; and output image generation means. The background generation means generates, on each of corresponding pixel positions of more than one input image, a pixel value involved in a predetermined distribution among pixel values of the input images as a background pixel value in the above pixel position. The degree-of-difference generation means generates, on each of the above pixel positions, a degree-of-difference indicating a degree to which each input image pixel value has a difference from the background pixel value. The output image generation means generates, on each of the above pixel positions, an output image pixel value by reflecting the input image pixel values depending on the degree-of-difference. This configuration produces an effect of permitting the output image pixel value to be generated depending on the degree-of-difference between each input image pixel value and the background pixel value.

Also, in the first aspect of the present invention, the background generation means may be to generate a most frequently occurring pixel value as the above pixel value involved in the predetermined distribution. Consideration is given to use of a moving object-to-background difference in that the moving object has a characteristic feature of making a transitory passing, while the background relatively has consistency.

Further, in the first aspect of the present invention, the background generation means may also have background pixel value holding means; frequency-of-occurrence holding means; reference value setting means; background candidate generation means; and update determination means. The background pixel value holding means holds the background pixel value. The frequency-of-occurrence holding means holds a frequency-of-occurrence of the background pixel value. The reference value setting means sets a reference value for the input image pixel values. The background candidate generation means determines, as a background candidate value, the input image pixel value that falls in a predetermined range of difference from the reference value. The update determination means updates, after counting the frequency-of-occurrence of the background candidate value, so as to cause the frequency-of-occurrence of the background candidate value to be held in the frequency-of-occurrence holding means, and also, the background candidate value to be held as a latest background pixel value in the background pixel value holding means when the frequency-of-occurrence of the background candidate value is greater than the frequency-of-occurrence held in the frequency-of-occurrence holding means. This configuration produces an effect of permitting the most frequently occurring pixel value to be held in the background pixel value holding means, without holding all the frequencies-of-occurrence of the respective pixel values.

Furthermore, in the first aspect of the present invention, the output image generation means may also have output image holding means; synthesis ratio generation means; and synthesis value calculation means. The output image holding means holds the output image pixel value. The synthesis ratio generation means generates, on each of the above pixel positions, a synthesis ratio depending on the degree-of-difference. The synthesis value calculation means synthesizes, on each of the above pixel positions, the input image pixel values with the output image pixel value held in the output image holding means depending on the synthesis ratio, causing a synthesis result to be held as a latest output image pixel value in the output image holding means. This configuration produces an effect of permitting the output image pixel value to be generated depending on the generated synthesis ratio from the degree-of-difference.

Furthermore, in the first aspect of the present invention, the output image generation means may also have output image holding means; frame number holding means; and update determination means. The output image holding means holds the output image pixel value. The frame number holding means holds an output image frame number. The update determination means causes the input image frame number to be held in the frame number holding means, and also, the input image pixel value to be held as a latest output image pixel value in the output image holding means when the input image frame number is more up-to-date in time series than the frame number held in the frame number holding means, provided that the degree-of-difference given is not less than a predetermined degree. This configuration produces an effect of permitting only the pixel value of the input image corresponding to a latest frame number to be reflected in the output image.

Furthermore, in the first aspect of the present invention, the output image generation means may also have output image holding means; degree-of-difference holding means; and update determination means. The output image holding means holds the output image pixel value. The degree-of-difference holding means holds a degree-of-difference on the output image. The update determination means causes a degree-of-difference on the input image to be held in the degree-of-difference holding means, and also, the input image pixel value to be held as a latest output image pixel value in the output image holding means when the degree-of-difference on the input image is greater than the degree-of-difference held in the degree-of-difference holding means. This configuration produces an effect of permitting only the pixel value of the input image having a maximum degree-of-difference to be reflected in the output image.

A second aspect of the present invention is to provide an image processing apparatus having image selection means; background generation means; degree-of-difference generation means; and output image generation means. The image selection means selects a predetermined number of input images as selected images from more than one input image. The background generation means generates, on each of corresponding pixel positions of the selected images, a pixel value involved in a predetermined distribution among pixel values of the selected images as a background pixel value in the above pixel position. The degree-of-difference generation means generates, on each of the above pixel positions, a degree-of-difference indicating a degree to which each input image pixel value has a difference from the background pixel value. The output image generation means generates, on each of the above pixel positions, an output image pixel value by reflecting the input image pixel values depending on the degree-of-difference. This configuration produces an effect of permitting the number of selected images used to generate the background pixel value to be set arbitrarily.

A third aspect of the present invention is to provide an image processing apparatus having background image holding means; output image holding means; background generation means; degree-of-difference generation means; and output image synthesis means. The background image holding means holds a background image pixel value. The output image holding means holds an output image pixel value. The background generation means updates the background image pixel value held in the background image holding means based on a predetermined ratio and with pixel values in corresponding pixel positions of input images allowed to enter in time series. The degree-of-difference generation means generates a degree-of-difference indicating a degree to which each input image pixel value has a difference from the pixel value in the corresponding pixel position of the updated background image provided by the background generation means. The output image synthesis means synthesizes, on the output image pixel value, the pixel values in the corresponding pixel positions of the input images depending on the degree-of-difference, causing a synthesis result to be held as a latest output image pixel value in the output image holding means. This configuration produces an effect of permitting the output image pixel value to be generated depending on the degree-of-difference from each input image pixel value by updating the background image with the input images allowed to enter in time series.

A fourth aspect of the present invention is to provide an image processing apparatus having image selection means; background generation means; background image holding means; output image holding means; degree-of-difference generation means; and output image synthesis means. The image selection means selects a predetermined number of input images as selected images from more than one input image. The background generation means generates, on each of corresponding pixel positions of the selected images, a pixel value involved in a predetermined distribution among pixel values of the selected images as a pixel value in a corresponding pixel position of a background image. The background image holding means holds the background image pixel value. The output image holding means holds an output image pixel value. The degree-of-difference generation means generates a degree-of-difference indicating a degree to which each input image pixel value has a difference from the corresponding background image pixel value held in the background image holding means. The output image synthesis means synthesizes, on the output image pixel value, the pixel values in the corresponding pixel positions of the input images depending on the degree-of-difference, causing a synthesis result to be held as a latest output image pixel value in the output image holding means. This configuration produces an effect of permitting the number of selected images used to generate the background pixel value to be set arbitrarily.

A fifth aspect of the present invention is to provide an image processing apparatus having image selection means; background generation means; background image holding means; output image holding means; degree-of-difference generation means; output image synthesis means; background image storage means. The image selection means selects a predetermined number of input images as selected images from more than one input image. The background generation means generates, on each of corresponding pixel positions of the selected images, a pixel value involved in a predetermined distribution among pixel values of the selected images as a pixel value in a corresponding pixel position of a background image. The background image holding means holds the background image pixel value. The output image holding means holds an output image pixel value. The degree-of-difference generation means generates a degree-of-difference indicating a degree to which each input image pixel value has a difference from the corresponding background image pixel value held in the background image holding means. The output image synthesis means synthesizes, on the output image pixel value, the pixel values in the corresponding pixel positions of the input images depending on the degree-of-difference, causing a synthesis result to be held as a latest output image pixel value in the output image holding means. The background image storage means for storing the background image pixel value held in the background image holding means. The background image holding means makes restoration of the background image stored in the background image storage means before holding, when a required background image is contained in the background image storage means. This configuration produces an effect of permitting processing for generating the background image to be saved by using the background image in the back stored ground image storage means through the restoration.

According to the present invention, the effects may be obtained as excellent as of generating the locus-synthesized image of the moving object from more than one frame image provided by being imaged in time series, without being affected by the condition of the background in the frame image and/or the moving object characteristics such as the number, the size, the deformation and the color.

BRIEF DESCRIPTION OF THE DRAWINGS

FIG. 8 is a block diagram showing one configuration of a degree-of-difference generation unit included in the first example of the image processing circuit according to the embodiment of the present invention;

DESCRIPTION OF THE EMBODIMENTS

Figure 1:
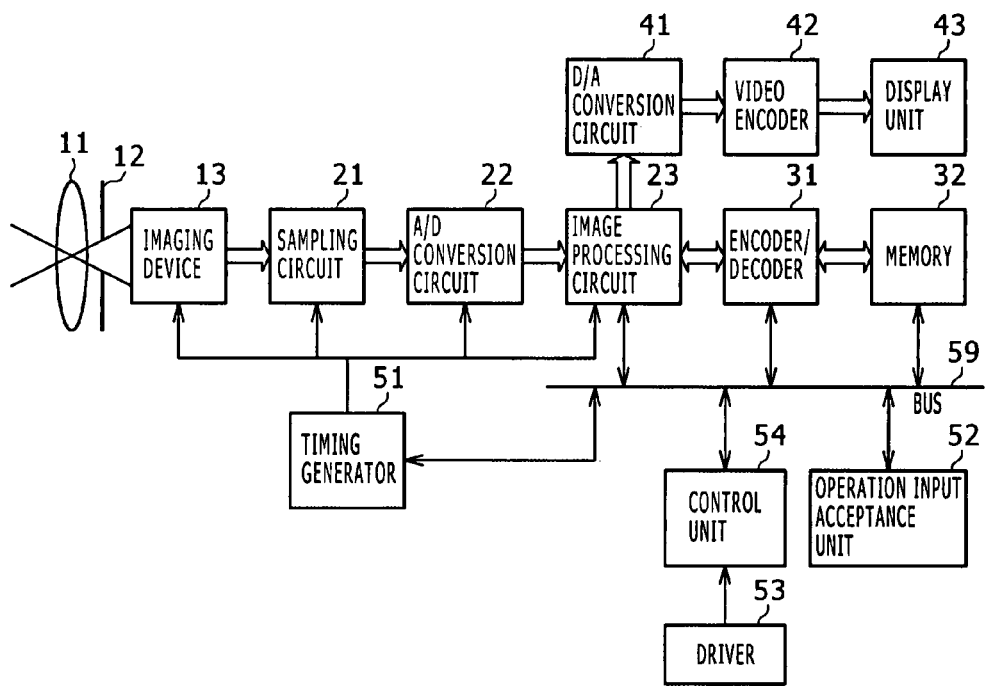
FIG. 1 is a block diagram showing one instance of an imaging apparatus according to one embodiment of the present invention.

FIG. 1 is a block diagram showing one instance of an imaging apparatus according to one embodiment of the present invention. Roughly speaking, the imaging apparatus shown is composed of an optical system, signal processing system, a recording system, a display system and a control system.

The optical system is composed of a lens 11 that focuses an optical image of an object, a diaphragm 12 that controls an amount of light of the optical image, and an imaging device 13 that photoelectric-converts the focused optical image into an electric signal. The imaging device 13 is implemented with an image sensor such as CCD (Charge Coupled Devices), for instance.

The signal processing system is composed of a sampling circuit 21 that effects sampling of the electric signal supplied from the imaging device 13, an A/D conversion circuit 22 that converts an analog signal supplied from the sampling circuit 21 into a digital signal, and an image processing circuit 23 that gives predetermined image processing to the digital signal supplied from the A/D conversion circuit 22. The sampling circuit 21 is implemented with a correlated double sampling circuit (CDS), for instance. Use of the CDS circuit may get relief from noises originating in the imaging device 13. It is to be noted that processing to be performed with the image processing circuit 23 is detailed later.

The recording system is composed of a memory 32 used to store an image signal, and an encoder/decoder 31 that encodes and records, in the memory 32, the image signal given the processing by the image processing circuit 23, and also, after reading out the image signal from the memory 32, decodes and supplies the read image signal to the image processing circuit 23.

The display system is composed of a D/A conversion circuit 41 that analogizes the image signal given the processing by the image processing circuit 23, a video encoder 42 that encodes the analogized image signal into a video signal of a form adapted for a post-staged display unit 43, and the display unit 43 that displays an image corresponding to the video signal inputted. The display unit 43 is implemented with a LCD (Liquid Crystal Display) etc., for instance, and also provides a function as a viewfinder.

The control system is composed of a timing generator 51 that controls operation timings of the imaging device 13, the sampling circuit 21, the A/D conversion circuit 22 and the image processing circuit 23, an operation input acceptance unit 52 used to accept input of a shutter operation and other commands given by a user, driver 53 used to make connection with a peripheral equipment, and a control unit 54 that controls the imaging apparatus in its entirety. The driver 53 is connected to peripheral equipment such as a magnetic disk, an optical disc, a magneto-optical disc and a semiconductor memory. The control unit 54 reads out, through the driver 53, a control program placed in the above peripheral equipment, and then provides control based on the read control program and/or the commands etc. given by the user through the operation input acceptance unit 52.

The image processing circuit 23, the encoder/decoder 31, the memory 32, the timing generator 51, the operation input acceptance unit 52 and the control unit 54 are interconnected through a bus 59.

As for the imaging apparatus of this type, the optical image (incident light) of the object is allowed to enter the imaging device 13 through the lens 11 and the diaphragm 12, and is then photoelectric-converted into the electric signal by the imaging device 13. The electric signal obtained undergoes removal of noise components by the sampling circuit 21, and is then digitized by the A/D conversion circuit 22, followed by being temporarily stored in an image memory (not shown) integrated in the image processing circuit 23.

It is to be noted that in a normal condition, control by the timing generator 51 to the signal processing system is adapted to provide continual overwriting of the image signal at a certain frame rate for the image memory integrated in the image processing circuit 23. The image signal in the image memory integrated in the image processing circuit 23 is converted into the analog signal by the D/A conversion circuit 41, and further, into the video signal by the video encoder 42, causing a corresponding image to be displayed on the display unit 43.

The display unit 43 also functions as the viewfinder of the imaging apparatus. If a shutter button included in the operation input acceptance unit 52 is pushed down by the user, the control unit 54 permits the timing generator 51 to control the signal processing system so as to hold the image signal provided immediately after the shutter button is pushed down, or to prevent the image signal from being overwritten in the image memory of the image processing circuit 23. Image data placed in the image memory of the image processing circuit 23 is encoded by the encoder/decoder 31, and is then recorded in the memory 32. Operations of the imaging apparatus as described the above cause capturing of a single frame of image data to be completed.

Figure 2:
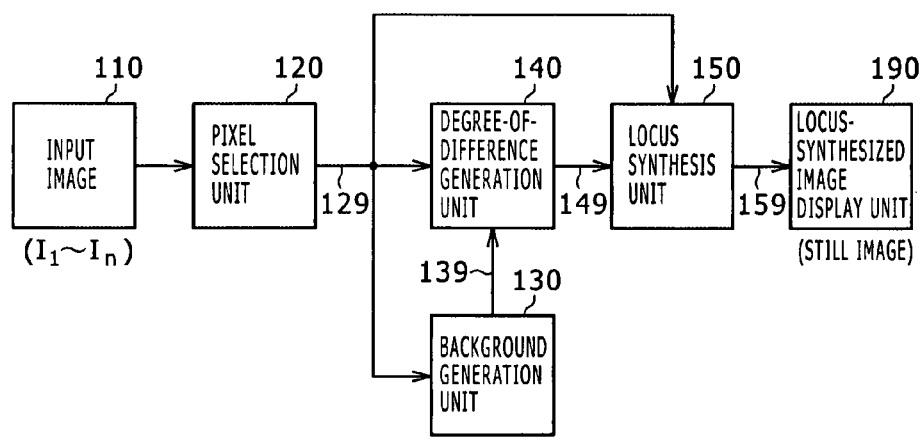
FIG. 2 is a block diagram showing a first example of an image processing circuit of the imaging apparatus according to the embodiment of the present invention.

FIG. 2 is a block diagram showing a first example of the image processing circuit 23 of the imaging apparatus according to one embodiment of the present invention. The image processing circuit 23 according to the first embodiment has a pixel selection unit 120, a background generation unit 130, a degree-of-difference generation unit 140, a locus synthesis unit 150, and a locus-synthesized image display unit 190.

The pixel selection unit 120 is to select n (n, is an integer of not less than 2) pieces of pixel values in corresponding pixel positions as for n frames of input images 110 (I1 to In) provided by being imaged in time series. Assuming that each of the input images 110 is composed of p×q pixels (p and q are integers of not less than 1) in coordinates from (1,1) to (p,q), for instance, the pixel selection unit 120 firstly selects each pixel value in the pixel position of the coordinate (1,1) out of the n frames of input images 110, causing the n pieces of pixel values to be selected. Subsequently, the pixel selection unit 120 selects each pixel value in the pixel position of the coordinate (1,2) out of the n frames of input images 110, causing the following n pieces of pixel values to be selected. Finally, the n pieces of pixel values are selected in this manner as many as for p×q groups of the pixels with respect to the input images 110 (I1 to In). These selected pixel values are supplied to the background generation unit 130, the degree-of-difference generation unit 140 and the locus synthesis unit 150 through a signal line 129.

The background generation unit 130 is to generate a background value based on the n pieces of pixel values supplied from the pixel selection unit 120 through the signal line 129. The n pieces of pixel values are supplied as many as for the p×q groups of the pixels as described the above, so that the background generation unit 130 finally yields p×q pieces of background values with respect to the input images 110 (I1 to In). These background values are supplied to the degree-of-difference generation unit 140 through a signal line 139.

The degree-of-difference generation unit 140 is to generate a degree-of-difference between the background value supplied from the background generation unit 130 through the signal line 139 and each pixel value supplied from the pixel selection unit 120 through the signal line 129. As described the above, each background value composed of p×q pixels is generated by the background generation unit 130. Thus, the degree-of-difference generation unit 140 generates respectively the degree-of-difference between the background value generated and each of the n pieces of pixel values of the input images 110 (I1 to In) for each background value pixel position, finally causing the n pieces of degrees-of-difference to be generated as many as for the p×q groups of the pixels with respect to the input images 110 (I1 to In). These generated degrees-of-difference are supplied to the locus synthesis unit 150 through a signal line 149.

The locus synthesis unit 150 is to synthesize the pixel values supplied from the pixel selection unit 120 through the signal line 129 based on the degree-of-difference supplied from the degree-of-difference generation unit 140 through the signal line 149. As described the above, the n pieces of degrees-of-difference are generated as many as for the p×q groups of the pixels, and the n pieces of pixel values are selected as many as for the p×q groups of the pixels. In other words, the degrees-of-difference agree with the pixel values in number. The locus synthesis unit 150 finally yields a single pixel value as a locus synthesis value from the n pieces of pixel values, causing a locus-synthesized image having p×q pieces of locus synthesis values to be generated. These locus synthesis values are supplied to the locus-synthesized image display unit 190 through a signal line 159.

The locus-synthesized image display unit 190 is to display the locus-synthesized image based on the locus synthesis values supplied from the locus synthesis unit 150 through the signal line 159. The locus-synthesized image display unit 190 may be shared with the display unit 43 intact, or alternatively, may be implemented with a different display apparatus connected to the imaging apparatus.

Figure 3:
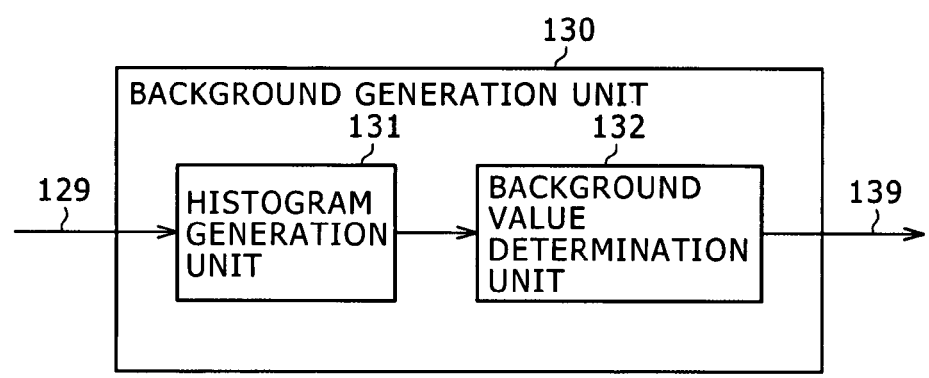
FIG. 3 is a block diagram showing one instance of a first configuration of a background generation unit included in the first example of the image processing circuit according to one embodiment of the present invention.

FIG. 3 shows one instance of a first configuration example of the background generation unit 130 included in the first example of the image processing circuit 23 according to the embodiment of the present invention. The background generation unit 130 shown has a histogram generation unit 131 and a background value determination unit 132.

Figure 4:
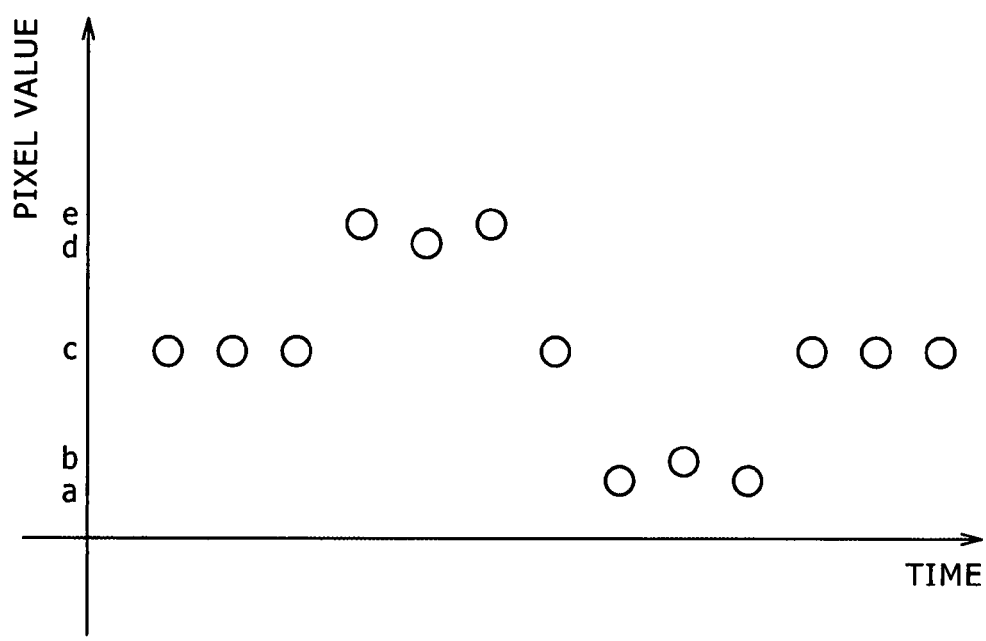
FIG. 4 is a graphic representation example of one distribution of pixel values.
Figure 5:
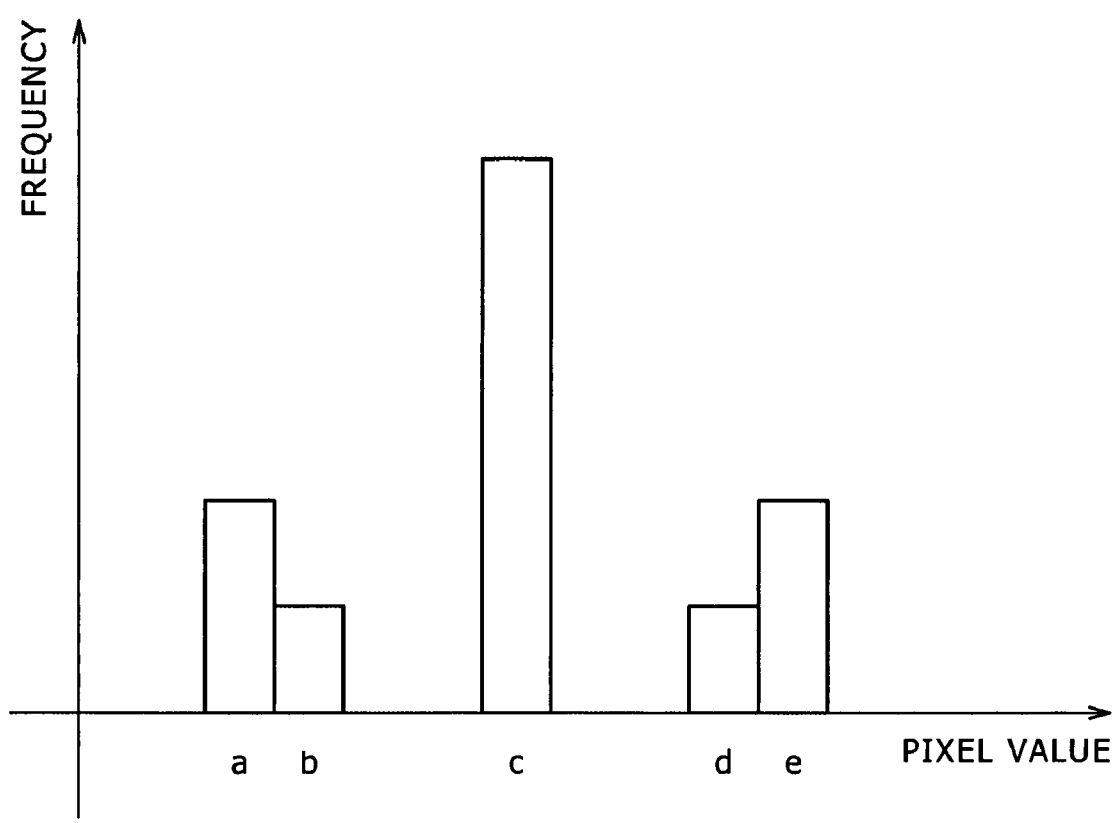
FIG. 5 is a graphic representation of one instance of a histogram based on the distribution of the pixel values.

The histogram generation unit 131 is to generate a histogram on the n pieces of pixel values supplied from the pixel selection unit 120 through the signal line 129. The histogram generated expresses a frequency-of-occurrence of the pixel values as against their sizes. Assuming that a distribution of the pixel values exists as shown in FIG. 4, for instance, the histogram on these pixel values is presented in the form of a histogram as shown in FIG. 5. Specifically, for the frequencies-of-occurrence on 13 pieces of pixel values in FIG. 4, pixel values a, b, c, d and e respectively occur twice, once, seven times, once and twice, in which case, the histogram as shown in FIG. 5 is generated.

It is to be noted that the histogram is presented in the form of a one-dimensional histogram as shown in FIG. 4 if luminance is only taken into account, or may be made in the form of a three-dimensional histogram if RGB-type pixel values are provided. In other words, the histogram is supposed to be generated in the form of any dimensional histogram suited to a color space to be defined.

The background value determination unit 132 is to determine the background value depending on the histogram generated in the histogram generation unit 131. Specifically, the background value determination unit 132 determines a most frequently occurring pixel value in the histogram to be the background value. In case as shown in FIG. 4, for instance, the pixel value c offering a mode is determined to be the background value.

Figure 6:
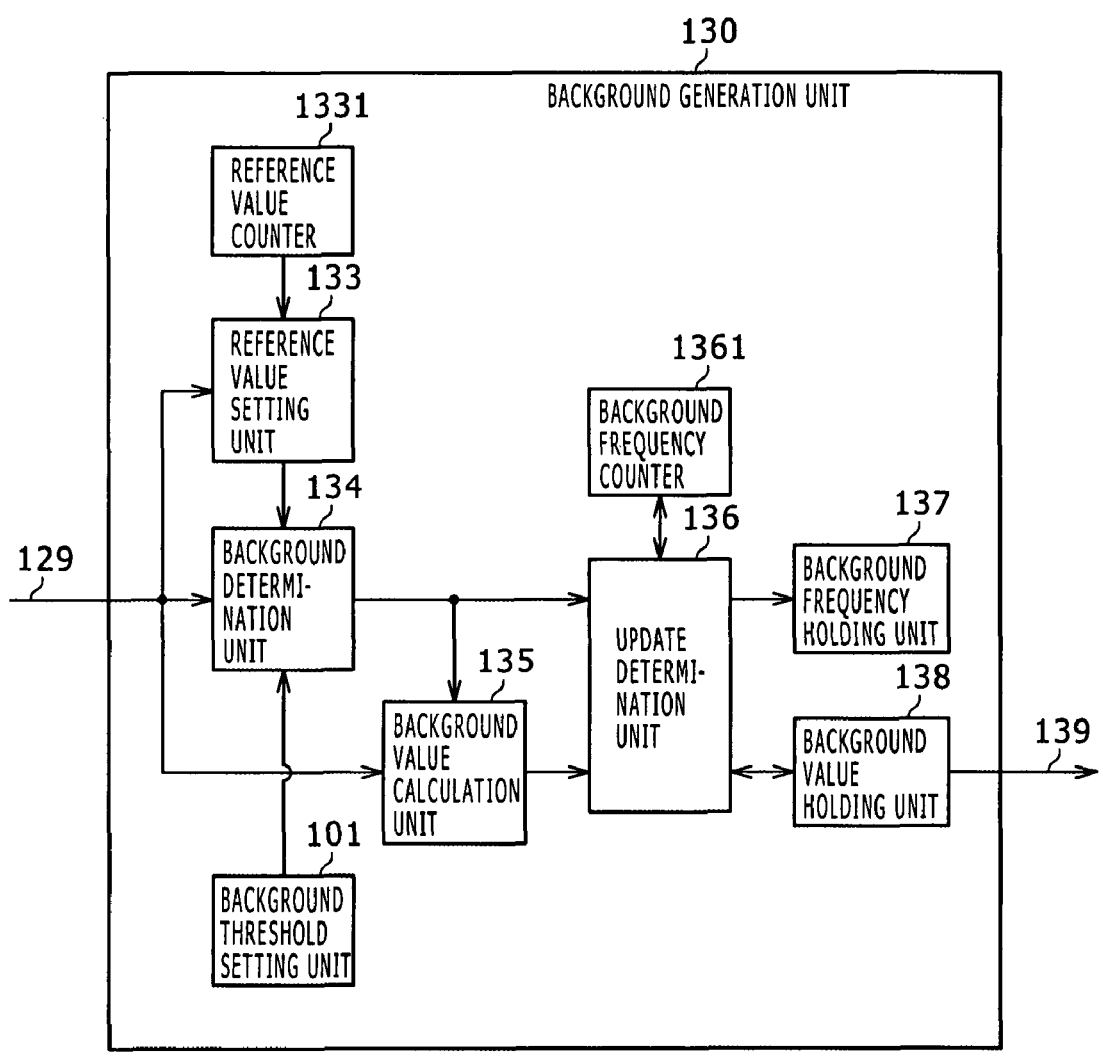
FIG. 6 is a block diagram showing one instance of a second configuration of the background generation unit included in the first example of the image processing circuit according to the embodiment of the present invention.

FIG. 6 shows one instance of a second configuration of the background generation unit 130 included in the first example of the image processing circuit 23 according to the embodiment of the present invention. The background generation unit 130 shown has a background threshold setting unit 101, a reference value setting unit 133, a reference value counter 1331, a background determination unit 134, a background value calculation unit 135, an update determination unit 136, a background frequency counter 1361, a background frequency holding unit 137 and a background value holding unit 138.

The background determination unit 134 is to determine whether or not the pixel values of the input images 110 are of the background. The reference value setting unit 133 is to set a value (or a reference value) serving as a reference used for the background determination unit 134 to determine the background. The reference value counter 1331 is to sequentially supply the reference value that is to be set in the reference value setting unit 133. The background threshold setting unit 101 is to supply a threshold (or a background threshold) yielded from the reference value used for the background determination unit 134 to determine the background. The background determination unit 134 calculates a distance between the reference value set in the reference value setting unit 133 and each pixel value of the input images 110, and then determines the pixel value distant from the reference value by the background threshold or less to be of the background. It is to be noted that the distance in this case involves a color spatial distance etc., for instance. Thus, in a case of a multi-dimensional space like an RGB space, for instance, the distance from the reference value by the background threshold or less respectively in all dimensions is judged to be of the background threshold or less.

Figure 7:
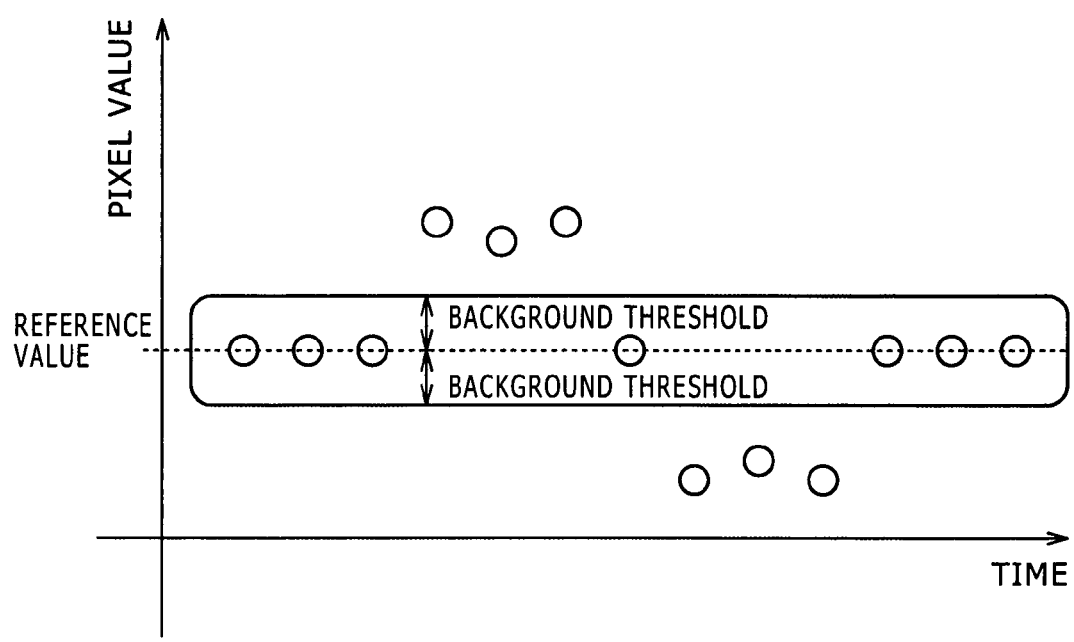
FIG. 7 is a graphic representation of one instance of a reference value and a background threshold according to the embodiment of the present invention.

For the distribution of the pixel values as shown in FIG. 7, if the reference value is given as illustrated, for instance, a pixel value range including upper and lower background thresholds respectively given to the pixel values centering around the given reference value is regarded as a background range. The reference value to be set in the reference value setting unit 133 undergoes sequential changes by the reference value counter 1331. The reference value is to be sequentially set in ascending or descending order of the pixel values, for instance. This processing causes determination whether or not each pixel value is in the range of the background as seen from the reference value to be made by the background determination unit 134 over the whole range of the pixel values.

The background value calculation unit 135 calculates the background value from the pixel values determined to be of the background by the background determination unit 134. The background value is calculated as a mean of the pixel values determined to be of the background by the background determination unit 134, for instance.

The update determination unit 136 is to, after counting with the background frequency counter 1361, the frequency of the pixel values determined to be of the background by the background determination unit 134, determine whether or not updating should be made to the background frequency holding unit 137 and the background value holding unit 138. Specifically, only in a case where a count value provided by the background frequency counter 1361 is greater than a frequency value held in the background frequency holding unit 137, the updating is made so as to replace contents in the background frequency holding unit 137 with the count value provided by the background frequency counter 1361, together with replacement of contents in the background value holding unit 138 with the background value supplied from the background value calculation unit 135. This processing causes a mode value of the pixel value at that time to be held in the background value holding unit 138, and also, the frequency of the mode pixel value to be held in the background frequency holding unit 137. The sequential changes to the reference value setting unit 133 so as to set all the pixel values as the reference value finally causes the pixel value offering the mode to be held in the background value holding unit 138.

While the first configuration example of the background generation unit 130 in FIG. 3 requires a memory area to store the histogram in its entirety, the second configuration example of the background generation unit 130 in FIG. 6 is satisfied only by holding the frequency of the pixel value offering the mode at that time, and thus, enables memory area saving.

FIG. 8 is a block diagram showing one configuration example of the degree-of-difference generation unit 140 included in the first example of the image processing circuit 23 according to the embodiment of the present invention. The degree-of-difference generation unit 140 shown has a distance calculation unit 141, a distance threshold setting unit 102, and a degree-of-difference calculation unit 142.

The distance calculation unit 141 is to calculate the distance between the background value supplied from the background generation unit 130 through the signal line 139 and each pixel value supplied from the pixel selection unit 120 through the signal line 129. It is to be noted that the distance in this case involves the color spatial distance etc., for instance.

The degree-of-difference calculation unit 142 is to calculate the degree-of-difference between the background value and each input image pixel value depending on the distance calculated by the distance calculation unit 141. Specifically, the degree-of-difference calculation unit 142 is to distinguish in each input image between a moving object and the background, providing a moving object-to-background difference as the degree-of-difference. While the degree-of-difference is to be settled so as to assign "1" to the moving object, and "0" to the background, any intermediate value between "1" and "0" may be sometimes taken if the moving object and the background are not completely distinguishable from each other.

In calculating the degree-of-difference, the degree-of-difference calculation unit 142 assumes use of a threshold (or a distance threshold) of the distance to distinguish between the background and the moving object in considerations of an error depending on an image quality. Specifically, when the distance between the background value and each input image pixel value is within the distance threshold, the background and the moving object are treated as being not completely distinguishable from each other, while when exceeding the distance threshold, the background and the moving object are treated as being completely distinguishable from each other. As a result, in a case the distance between the background value and each input image pixel value exceeds the distance threshold, "1" specified as a maximum degree of difference is settled, while in a case of being within the distance threshold, the degree-of-difference is settled in proportion to the distance, for instance. It is to be noted that the distance threshold is to be preliminarily set in the distance threshold setting unit 102.

Figure 9:
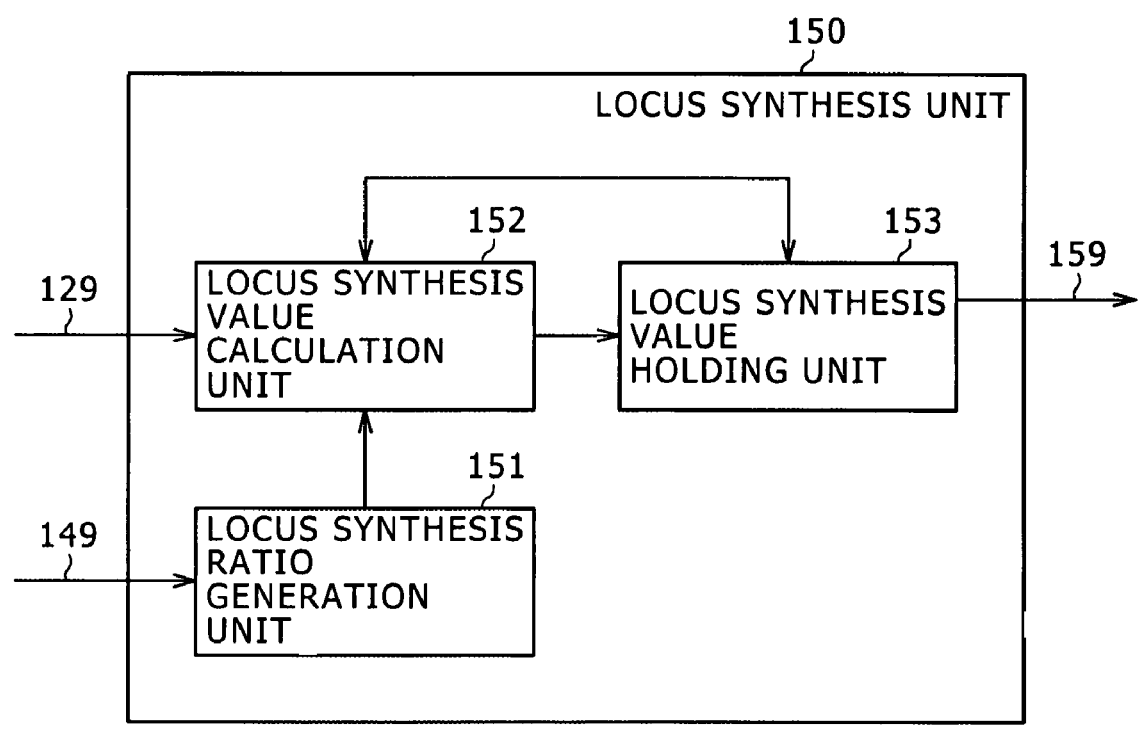
FIG. 9 is a block diagram showing one instance of a first configuration of a locus synthesis unit included in the first example of the image processing circuit according to the embodiment of the present invention.
Figure 10A:
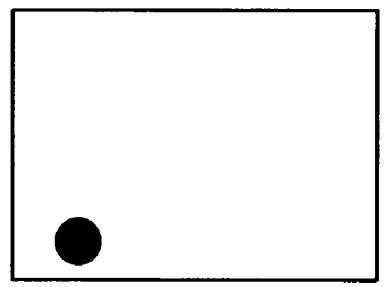
FIG. 10 shows one instance of an input image.
Figure 10B:
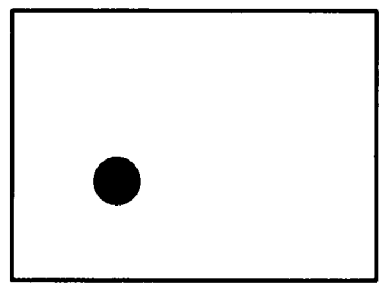
Figure 10C:
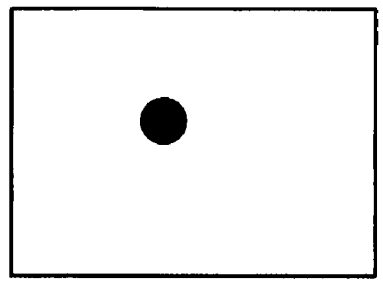
Figure 10D:
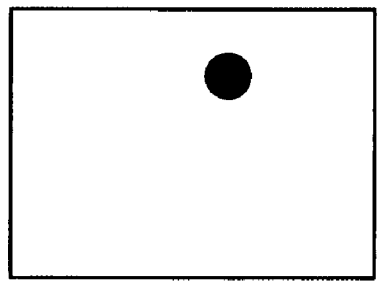
Figure 10E:
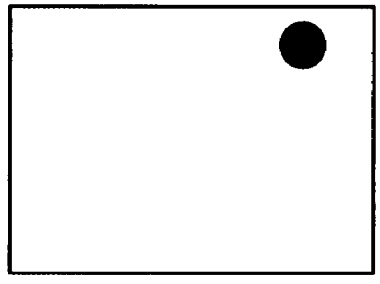

FIG. 9 is a block diagram showing one instance of a first configuration of the locus synthesis unit 150 included in the first example of the image processing circuit 23 according to one embodiment of the present invention. The locus synthesis unit 150 shown has a locus synthesis ratio generation unit 151, a locus synthesis value calculation unit 152 and a locus synthesis value holding unit 153.

The locus synthesis ratio generation unit 151 is to generate a ratio (or a locus synthesis ratio) for synthesis of the input image pixel values as a locus based on the degree-of-difference supplied from the degree-of-difference generation unit 140 through the signal line 149. The locus synthesis ratio generated may be settled in proportion to the degree-of-difference, for instance, or alternatively, by taking account of the degree-of-difference inclusive of that around the input image pixels.

The locus synthesis value holding unit 153 is to hold an output image pixel value (or a locus synthesis value) provided from the locus synthesis unit 150. The locus synthesis value calculation unit 152 is to synthesize, depending on the locus synthesis ratio generated by the locus synthesis ratio generation unit 151, the input image pixel values with respect to the pixel values held in the locus synthesis value holding unit 153. Specifically, the locus synthesis value to be held in the locus synthesis value holding unit 153 is supposed to be updated with the locus synthesis value calculation unit 152 at any time.

Now assuming that the locus synthesis ratio is represented by β, the locus synthesis value provided after updated based on a j-th input image is represented by $S_j$, a k(=j+1)-th input image is represented by $I_k$, and the locus synthesis value provided after updated based on the k-th input image is represented by $S_k$, the following expression is given.

$$S_k = \beta \times I_k + (1-\beta) \times S_j$$

Where j and k are integers, and β, Ik, Sj and Sk are real numbers.

Figure 11A:
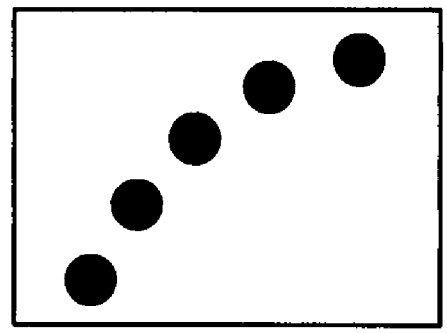
FIG. 11 shows one instance of a locus-synthesized image.

Effects with the locus synthesis ratio β are now described by assuming the images provided by being imaged in the order given in FIGS. 10A, 10B, 10C, 10D and 10E to be the input images. In a case where the locus synthesis value β is assigned as "1" to a moving object area having a great degree-of-difference and as "0" to a background area having a small degree-of-difference, the background and the moving object are synthesized without being merged, causing all moving object loci to be displayed dark-colored, as shown in FIG. 11A.

Figure 11B:
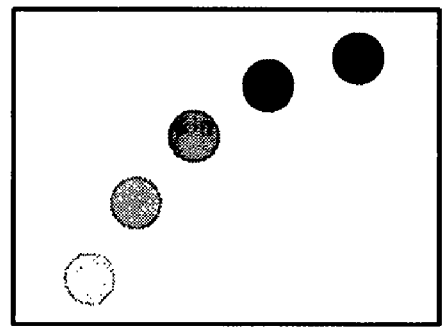
Figure 11C:
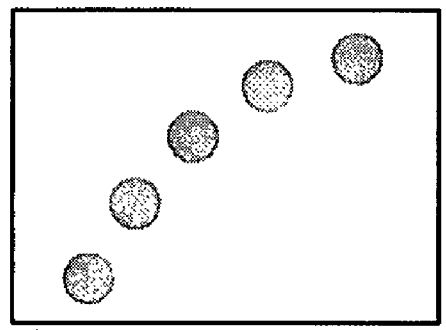

On the other hand, in a case where the locus synthesis value β is assigned as "1" to the moving object area, and as about "0.3" to "0.5" to the background area, the background gets merged with the moving object every time the synthesis is provided, causing the moving object loci to be displayed so as to become more light-colored as the locus becomes older, as shown in FIG. 11B.

Figure 12:
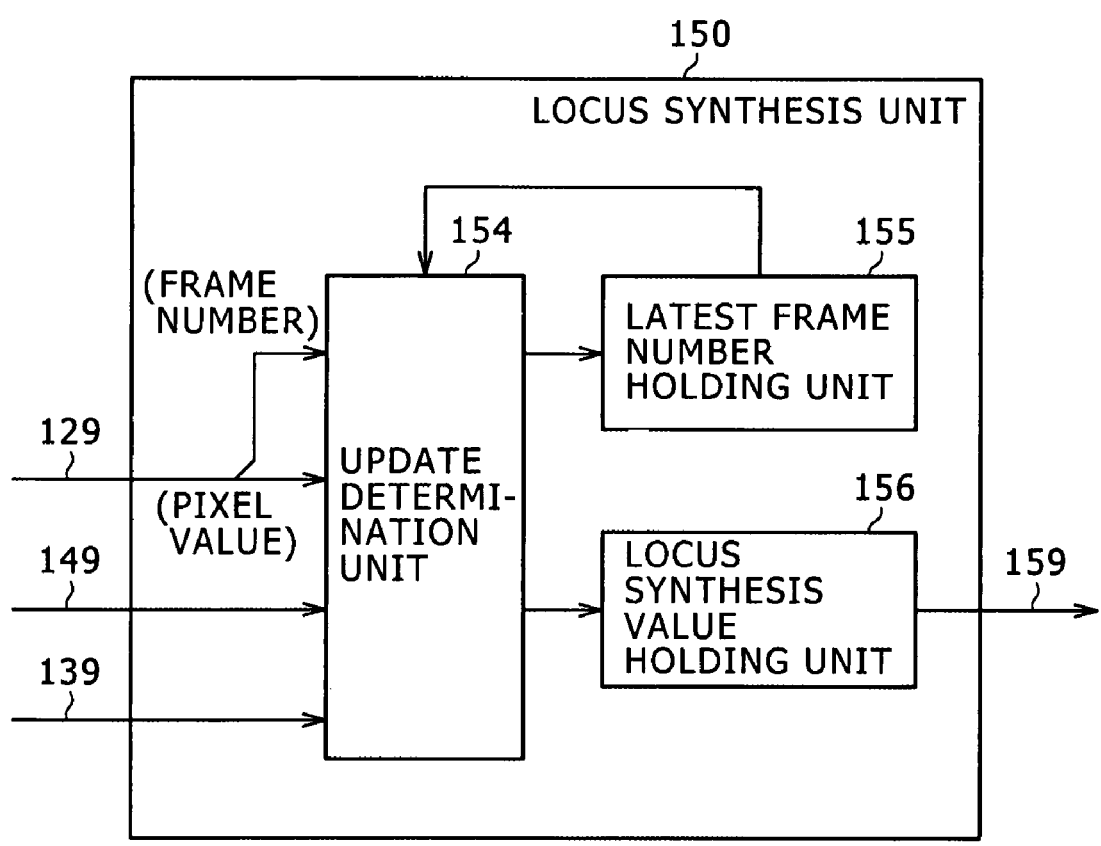
FIG. 12 is a block diagram showing one instance of a second configuration of the locus synthesis unit included in the first example of the image processing circuit according to the embodiment of the present invention.

FIG. 12 is a block diagram showing a second configuration example of the locus synthesis unit 150 included in the first example of the image processing circuit 23 according to the embodiment of the present invention. The locus synthesis unit 150 shown has an update determination unit 154, a latest frame number holding unit 155, and a locus synthesis value holding unit 156. The second configuration example of the locus synthesis unit 150 controls, in view of a case where input in imaging order is not applied to the input images 110 (I1 to In), to permit only the latest pixel value in each pixel position to be updated. Specifically, when the ascending consecutive numbers are assigned as frame numbers respectively to the input images 110 in the ascending order, the pixel value assigned with the greater frame number is assumed to be a more up-to-date pixel value. It is to be noted that the frame numbers are to be supplied together with the pixel values through the signal line 129.

The locus synthesis value holding unit 156 is to hold the locus synthesis value, like the locus synthesis value holding unit 153. However, the second configuration example specifies that the background value supplied through the signal line 139 is to be held as an initial value in advance.

The latest frame number holding unit 155 is to hold a maximum among the frame numbers of the input images 110 having been allowed to enter till then in a current pixel position.

The update determination unit 154 compares each frame number supplied through the signal line 129 with the frame number held in the latest frame number holding unit 155, and then causes the pixel value supplied through the signal line 129 to be held in the locus synthesis value holding unit 156 if the frame number supplied through the signal line 129 is more up-to-date, provided that no relation to the background exists. However, the update determination unit 154 allows the background value supplied through the signal line 139 to be held as the initial value in the locus synthesis value holding unit 156, before the first input image in each pixel position is selected. This processing causes the updating of only the latest and background-unrelated pixel value to be provided for the locus synthesis value holding unit 156 so that the most up-to-date moving object is given as the final locus synthesis value, permitting the locus synthesis value in view of time series order to be obtained.

Figure 13:
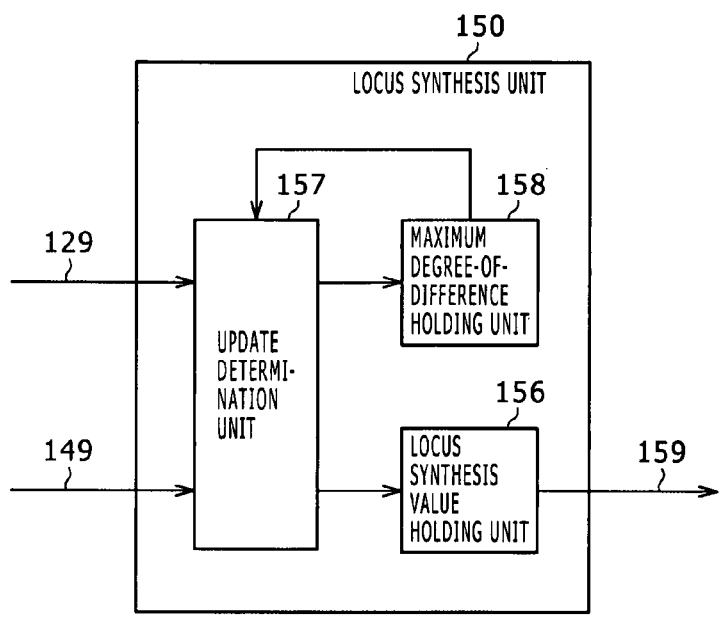
FIG. 13 is a block diagram showing one instance of a third configuration of the locus synthesis unit included in the first example of the image processing circuit according to the embodiment of the present invention.

FIG. 13 is a block diagram showing a third configuration example of the locus synthesis unit 150 included in the first example of the image processing circuit 23 according to one embodiment of the present invention. The locus synthesis unit 150 shown has an update determination unit 157, a maximum degree-of-difference holding unit 158, and a locus synthesis value holding unit 156. The locus synthesis value holding unit 156 is the same as that included in the second configuration example of the locus synthesis unit 150.

The maximum degree-of-difference holding unit 158 is to hold a maximum degree-of-difference having been allowed to enter till then in the current pixel position.

The update determination unit 157 compares each degree-of-difference supplied through the signal line 149 with the degree-of-difference held in the maximum degree-of-difference holding unit 158, and then causes the pixel value supplied through the signal line 129 to be held in the locus synthesis value holding unit 156 when the degree-of-difference supplied through the signal line 129 is greater. This processing causes the updating of only the pixel value having the maximum degree-of-difference to be provided for the locus synthesis value holding unit 156, permitting the locus having the greater degree-of-difference to be reflected in an area containing overlapped moving objects.

Figure 14:
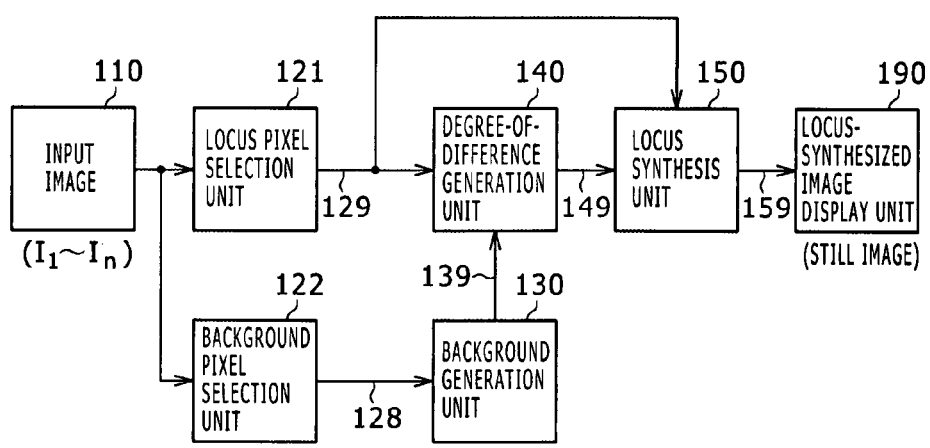
FIG. 14 is a block diagram showing a second example of the image processing circuit of the imaging apparatus according to one embodiment of the present invention.

FIG. 14 is a block diagram showing a second embodiment of the image processing circuit 23 of the imaging apparatus according to one embodiment of the present invention. The image processing circuit 23 according to the second embodiment has a locus pixel selection unit 121, a background pixel selection unit 122, the background generation unit 130, the degree-of-difference generation unit 140, the locus synthesis unit 150 and the locus-synthesized image display unit 190. Specifically, the first embodiment is different from the second embodiment in that the pixel selection unit 120 of the image processing circuit 23 according to the first embodiment in FIG. 2 is separated into the locus pixel selection unit 121 and the background pixel selection unit 122 in the case of the second example.

The background pixel selection unit 122 is to select the required pixel value for generation of the background value out of the n pieces of pixel values in the corresponding pixel positions as for the n frames of input images 110 (I1 to In) provided by being imaged in time series. While the first embodiment has made selection of all the n frames of input images to generate the background value, the second embodiment allows for simplification of processing for generating the background value by using thinned-out images provided from the n frames of input images. For instance, thinning-out of the input images into "n/10" on the pixel values selected by the background pixel selection unit 122 enables an increase in processing speed.

The locus pixel selection unit 121 is to select the pixel value other than that of the background, or the pixel value of the moving object locus. The locus pixel selection unit 121 selects the n pieces of pixel values in the corresponding pixel positions as for the n frames of input images 110 (I1 to In), like the pixel selection unit 120 in the first example.

In this manner, the image processing circuit 23 in the second example may hold down a background calculation cost by thinning out the images on the pixel values selected in the background pixel selection unit 122 by taking advantage of a fact that a frequency-of-change of the background is lower, as compared with that of the moving object.

Figure 15:
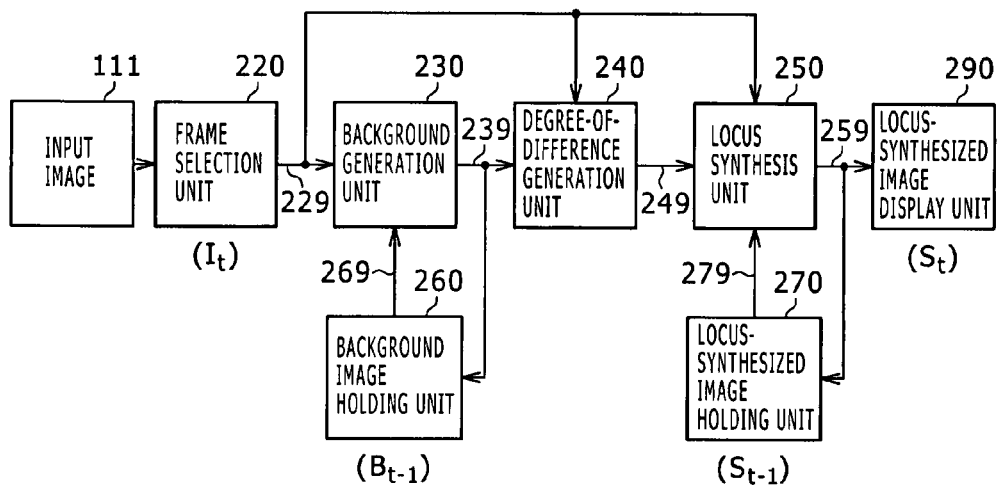
FIG. 15 is a block diagram showing a third example of the image processing circuit of the imaging apparatus according to one embodiment of the present invention.

FIG. 15 is a block diagram showing a third example of the image processing circuit 23 of the imaging apparatus according to one embodiment of the present invention. The image processing circuit 23 according to the third example has a frame selection unit 220, a background generation unit 230, a background image holding unit 260, a degree-of-difference generation unit 240, a locus synthesis unit 250, a locus-synthesized image holding unit 270, and a locus-synthesized image display unit 290. While the first and the second examples are provided on the assumption that the moving object locus is displayed as the single locus-synthesized image, the third example assumes that an in-moving state of the moving object is to be displayed as more than one locus-synthesized image, as shown in FIGS. 18 and 19, for instance.

The frame selection unit 220 is to sequentially select an image It composed of p×q pixels as a frame from input images 111 in the time series order. The selected frame is sequentially supplied to the background generation unit 230, the degree-of-difference generation unit 240 and the locus synthesis unit 250 through a signal line 229.

The background image holding unit 260 is to hold the background image composed of the p×q pixels. The background image held in the background image holding unit 260 is supplied to the background generation unit 230 through a signal line 269. The background generation unit 230 is to generate a latest background image $B_t$ based on the pixel value of a background image $B_{t-1}$ supplied from the background generation unit 230 through the signal line 269 and the pixel value, of the frame $I_t$ supplied from the frame selection unit 220 through the signal line 229. Specifically, the background generation unit 230 updates the background image to be held in the background image holding unit 260 by replacing the image with a latest frame, causing the background image at that time to be held in the background image holding unit 260. The generated background image is supplied to the degree-of-difference generation unit 240 and the background image holding unit 260 through a signal line 239.

The degree-of-difference generation unit 240 is to generate the degree-of-difference on a pixel position basis between the pixel value of the background image supplied from the background generation unit 230 through the signal line 239 and the pixel value of the frame supplied from the frame selection unit 220 through the signal line 229. Specifically, the degree-of-difference generation unit 240 generates the degrees-of-difference as many as for the p×q groups of the pixels by calculating the corresponding pixel value-to-pixel value distances as many as for the p×q groups of the pixels. The degree-of-difference generation unit 240 has the same internal configuration as the degree-of-difference generation unit 140 shown in FIG. 8.

The locus-synthesized image holding unit 270 is to hold the locus-synthesized image consisting of the p×q pixels. The locus-synthesized image held in the locus-synthesized image holding unit 270 is supplied to the locus synthesis unit 250 through a signal line 279. The locus synthesis unit 250 is to generate a latest locus-synthesized image $S_t$ by synthesizing the pixel value of a locus-synthesized image $S_{t-1}$ supplied from the locus-synthesized image holding unit 270 through the signal line 279 and the pixel value of the frame $I_t$ supplied from the frame selection unit 220 through the signal line 229. Specifically, the locus synthesis unit 250 updates the locus-synthesized image to be held in the locus-synthesized image holding unit 270 by replacing the image with the latest frame, causing the locus-synthesized image at that time to be held in the locus-synthesized image holding unit 270.

The locus-synthesized image display unit 290 is to display the locus-synthesized image $S_t$ supplied from the locus synthesis unit 250 through a signal line 259. The locus-synthesized image display unit 290 may be shared with the display unit 43 intact, or alternatively, may be implemented with the different apparatus connected to the imaging apparatus.

Figure 16:
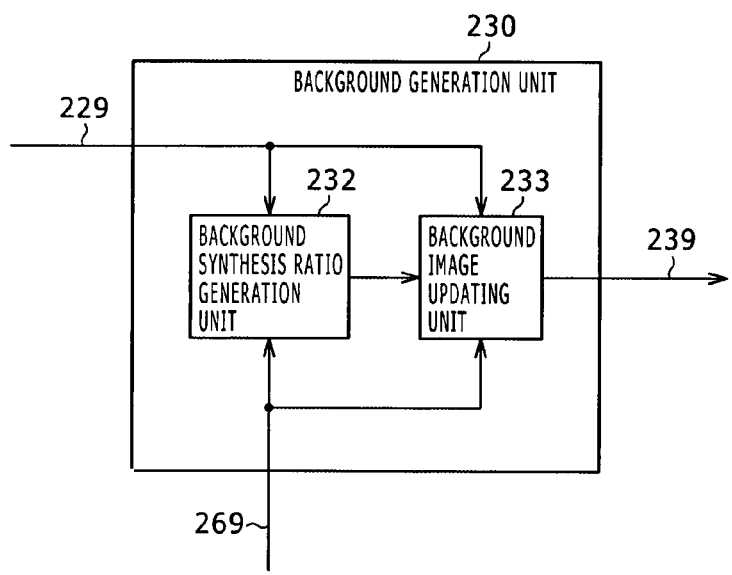
FIG. 16 is a block diagram showing one configuration of a background generation unit included in the third example of the image processing circuit according to the embodiment of the present invention.

FIG. 16 is a block diagram showing one configuration example of the background generation unit 230 included in the third example of the image processing circuit 23 according to one embodiment of the present invention. The background generation unit 230 shown has a background synthesis ratio generation unit 232 and a background image update unit 233.

The background synthesis ratio generation unit 232 is to generate a synthesis ratio (or a background synthesis ratio α) of the background image based on the frame supplied from the frame selection unit 220 through the signal line 229 and the background image supplied from the background image holding unit 260 through the signal line 269. As specific calculation of the background synthesis ratio α, one method is suggested, for instance, to determine the background synthesis ratio so as to provide a greater contribution for the pixel value of the frame $I_t$ when the degree-of-difference between the pixel value of the frame It and the pixel value of the background image $B_{t-1}$ is small, or to determine the synthesis ratio dynamically based on the degree-of-difference so as to increase the contribution of the pixel value of the frame $I_t$ when a small dispersion exists in temporally nearby degrees-of-difference. Alternatively, it is also allowable to preliminarily settle the background synthesis ratio α as a fixed value.

The background image update unit 233 is to update the background image supplied from the background image holding unit 260 through the signal line 269 by replacing the image with the frame supplied from the frame selection unit 220 through the signal line 229, depending on the background synthesis ratio α generated by the background synthesis ratio generation unit 232.

Now assuming that the pixel value of the frame $I_t$ in a coordinate (x, y) is represented by I(x, y, t), and, likewise, the pixel value of the background image $B_{t-1}$ is represented by (x, y, t−1), a pixel value B(x, y, t) of the latest background image $B_t$ is obtained by the following expression.

$$B(x,y,t)=\alpha \times I(x,y,t)+(1-\alpha)\times B(x,y,t-1)$$

The background image update unit 233 gives the processing meeting the above expression to all the pixels.

While the above embodiment specifies that the single image $I_t$ is selected as the frame by the frame selection unit 220, it may be modified to supply the frame to the background generation unit 230 based on more than one images. For instance, after finding, on the basis of images $I_{t-i}$ to $I_{t+i}$ arranged before and behind with the image $I_t$ between, a temporary background image from frequencies of the above images, like the examples shown in FIG. 3 or 6, the temporary background image found may be supplied to the background generation unit 230. This processing is expected to result in implementation of highly accurate background generation in the background generation unit 230.

Figure 17:
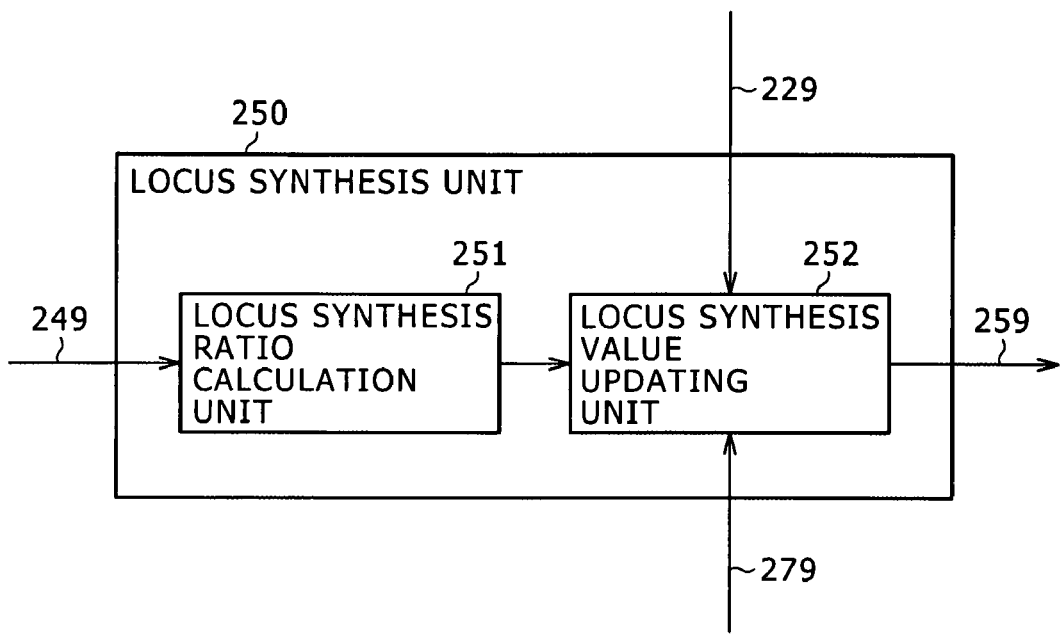
FIG. 17 is a block diagram showing one configuration of a locus synthesis unit included in the third example of the image processing circuit according to the embodiment of the present invention.
Figure 18A:
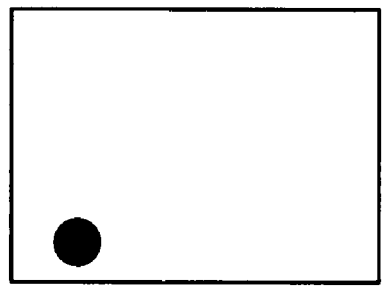
FIG. 18 shows one instance of each frame involved in a locus-synthesized moving image.
Figure 18B:
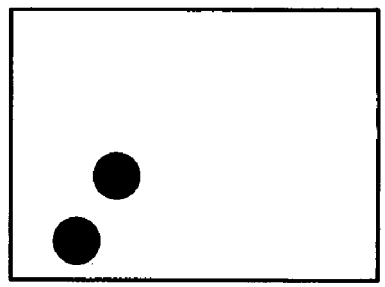
Figure 18C:
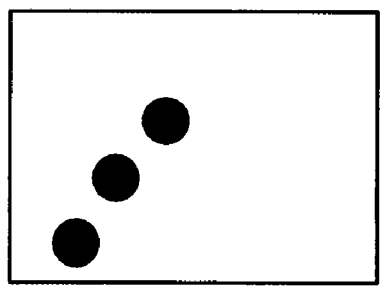
Figure 18D:
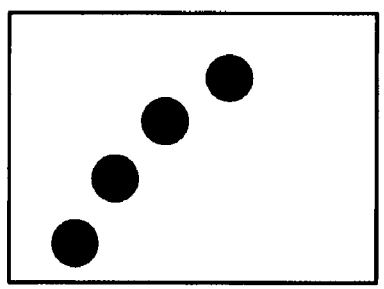
Figure 18E:
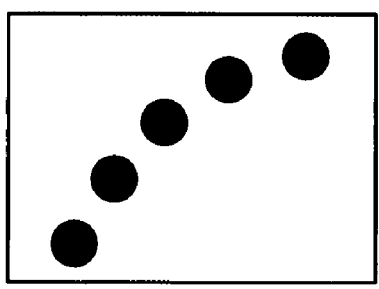
Figure 19A:
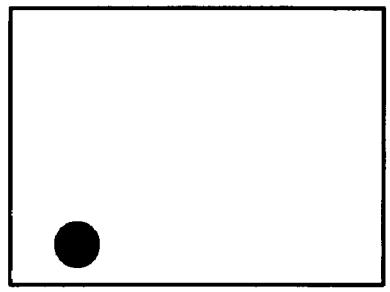
FIG. 19 shows another instance of each frame involved in the locus-synthesized moving image.
Figure 19B:
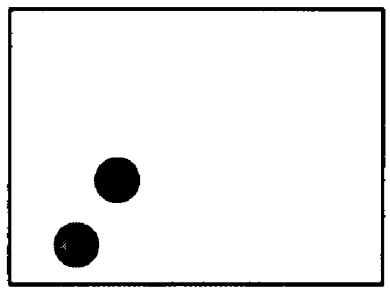
Figure 19C:
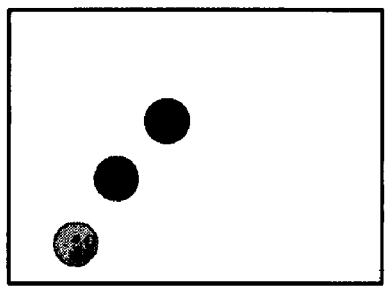
Figure 19D:
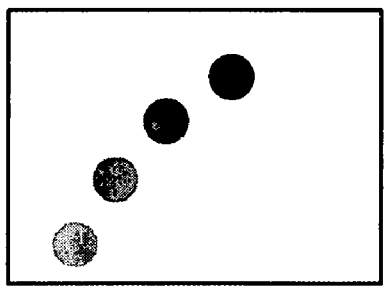
Figure 19E:
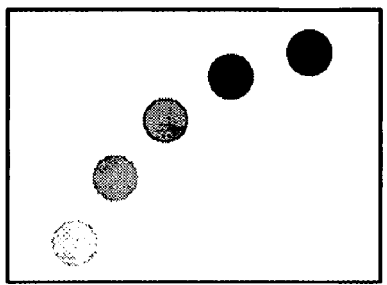

FIG. 17 is a block diagram showing one configuration of the locus synthesis unit 250 included in the third example of the image processing circuit 23 according to the embodiment of the present invention. The locus synthesis unit 250 shown has a locus synthesis ratio calculation unit 251 and a locus synthesis value update unit 252.

The locus synthesis ratio calculation unit 251 is to generate the synthesis ratio (or the locus synthesis ratio β) for the locus synthesis based on the degree-of-difference supplied from the degree-of-difference generation unit 240 through the signal line 249. As the specific calculation of the locus synthesis ratio β, one method is suggested to determine the locus synthesis ratio so as to provide the greater contribution for the pixel value of the frame $I_t$ when the degree-of-difference between the pixel value of the frame $I_t$ and the pixel value of the background image $B_{t-1}$ is great, for instance. Use of this method ensures that the rate of contribution to the locus synthesis value increases with the difference of the area from the background, permitting a more clearly displayed moving object locus to be obtained.

The locus synthesis value update unit 252 is to update the locus-synthesized image supplied from the locus-synthesized image holding unit 270 through the signal line 279 by replacing the image with the frame supplied from the frame selection unit 220 through the signal line 229, depending on the locus synthesis ratio generated by the locus synthesis ratio calculation unit 251.

Now assuming that the pixel value of the frame $I_t$ in the coordinate (x, y) is represented by I(x, y, t), and likewise, the pixel value of the locus-synthesized image $S_{t-1}$ is represented by S(x, y, t−1), a pixel value S(x, y, t) of the latest locus-synthesized image St may be obtained by the following expression.

$$S(x,y,t)=\beta \times I(x,y,t)+(1-\beta)\times S(x,y,t-1)$$

The locus-synthesized image update unit 252 gives the processing meeting the above expression to all the pixels.

Alternatively, as a different-mannered locus synthesis, one method is suggested to calculate the locus synthesis ratio using two types of calculation rules based on the degree-of-difference. Specifically, provided that the locus synthesis ratio calculation rule related to the background area having the small degree-of-difference is used separately from the calculation rule for the moving object area having the great degree-of-difference, a certain degree of locus synthesis ratio is to be given even if the degree-of-difference is small. Use of this method ensures that the rate of background contribution increases with the older area of the moving object locus, permitting the moving object locus to be displayed in a fade-out form. That is, while the up-to-date locus is clearly displayed, the other locus is allowed to fade out so as to be merged into the background with a passage of time.

In synthesizing the five frames as shown in FIG. 10, for instance, if the locus needs to leave as it is clearly displayed, assignment of the locus synthesis ratio β as "1" to the moving object area having the great degree-of-difference, and as "0" to the background area having the small degree-of-difference may produce the result as shown in FIG. 18. On the other hand, if the locus needs to fade out, the assignment of the locus synthesis ratio β as "1" to the moving object area and as about "0.3" to "0.5" to the background area may produce the result as shown in FIG. 19.

Figure 20:
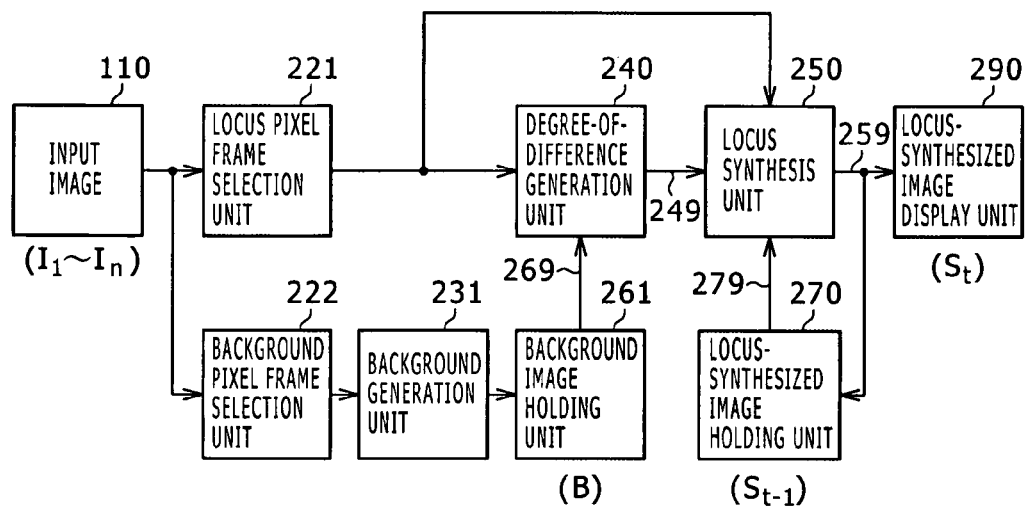
FIG. 20 is a block diagram showing a fourth example of the image processing circuit of the imaging apparatus according to the embodiment of the present invention.

FIG. 20 is a block diagram showing a fourth example of the image processing circuit 23 of the imaging apparatus according to the embodiment of the present invention. The image processing circuit 23 according to the fourth example has a locus pixel frame selection unit 221, a background pixel frame selection unit 222, a background generation unit 231, a background image holding unit 261, the degree-of-difference generation unit 240, the locus synthesis unit 250, the locus-synthesized image holding unit 270, and the locus-synthesized image display unit 290. The fourth embodiment is the same as the third example in that the in-moving state of the moving object is to be displayed as more than one locus-synthesized image. However, while the third embodiment is provided on the assumption that the frames from the input images 111 are provided without being settled in advance, the fourth example assumes that the n frames of input images 110 are predefined.

The background pixel frame selection unit 222 is to select the required pixel value for the generation of the background value out of the n pieces of pixel values in the corresponding pixel positions as for the n frames of input images 110 (I1 to In) provided by being imaged in time series. While the third example has made the selection of all the n frames of input images to generate the background value, the fourth example allows for the simplification of processing for generating the background value by using the thinned-out images provided from the n frames of input images. For instance, the thinning-out of the input images into "n/10" on the pixel values selected by the background pixel frame selection unit 222 enables the increase in processing speed.

The background generation unit 231 is to generate the background value based on the pixel value supplied from the background pixel frame selection unit 222, and is implemented with the same configuration as in the case of the first example.

The background image holding unit 261 is to hold the background image generated by the background generation unit 231. While the third example has made the sequential updating of the background image held in the background image holding unit 260 with the background generation unit 230, the fourth example specifies that the background image once generated is not subject to change, unless otherwise required.

The locus pixel frame selection unit 221 is to select the n pieces of pixel values in the corresponding pixel positions as for the n frames of input images 110 (I1 to In) provided by being imaged in time series. Specifically, unlike the background pixel frame selection unit 222, the locus pixel frame selection unit 221 makes the selection of all the input images without the thinning-out.

It is to be noted that other configuration of the fourth example is the same as that of the third example, and hence, its re-description is omitted.

In this manner, the fourth example provides, after calculating the background image frame only once, the locus synthesis sequentially in frame units using the calculated background image frame, permitting a processing cost to be lessened.

The operations of the imaging apparatus according to one embodiment of the present invention are now described with reference to the drawings.

Figure 21:
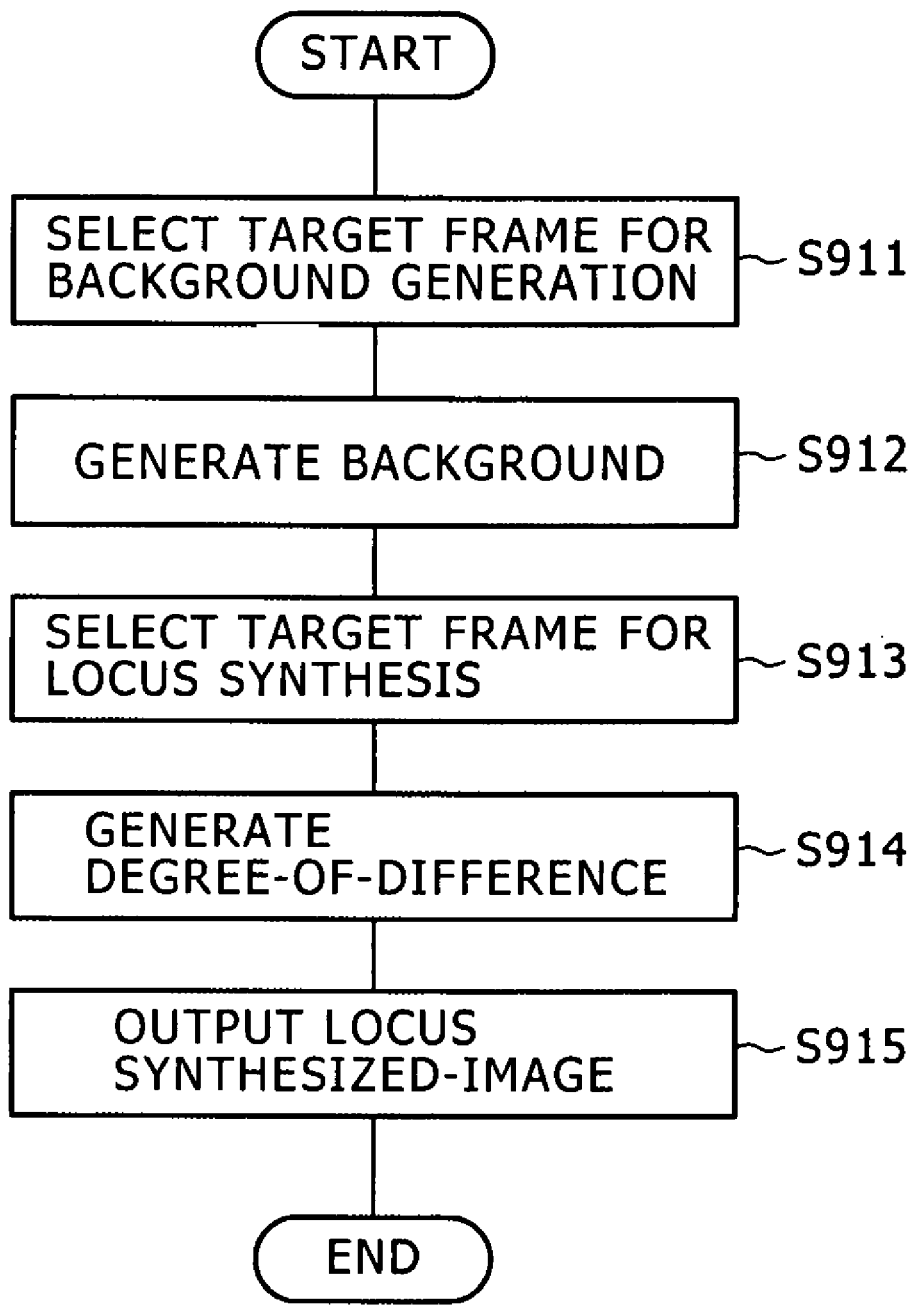
FIG. 21 is a flowchart showing one procedure of processing with the first and the second examples of the image processing circuit of the imaging apparatus according to the embodiment of the present invention.

FIG. 21 is a flowchart showing one procedure of the processing with the first and the second examples of the image processing circuit 23 of the imaging apparatus according to the embodiment of the present invention.

First, the pixel (or the frame) as the target for background generation is selected (Step S911). While this processing is performed with the pixel selection unit 120 in the first example, the second example employs the background pixel selection unit 122 to perform this processing. Then, the background image is generated from the selected pixel (or selected frame) (Step S912). This processing is performed with the background generation unit 130.

Subsequently, the pixel (or the frame) as the target for locus synthesis is selected (Step S913). While this processing is performed with the pixel selection unit 120 in the first example, the second embodiment employs the locus pixel selection unit 121 to perform this processing. Then, the degree-of-difference between the selected pixel (or selected frame) and the background is generated based on the selected pixel and the background (Step S914). This processing is performed with the degree-of-difference generation unit 140.

Then, the locus-synthesized image is outputted based on the degree-of-difference (Step S915). This processing is performed with the locus synthesis unit 150.

Figure 22:
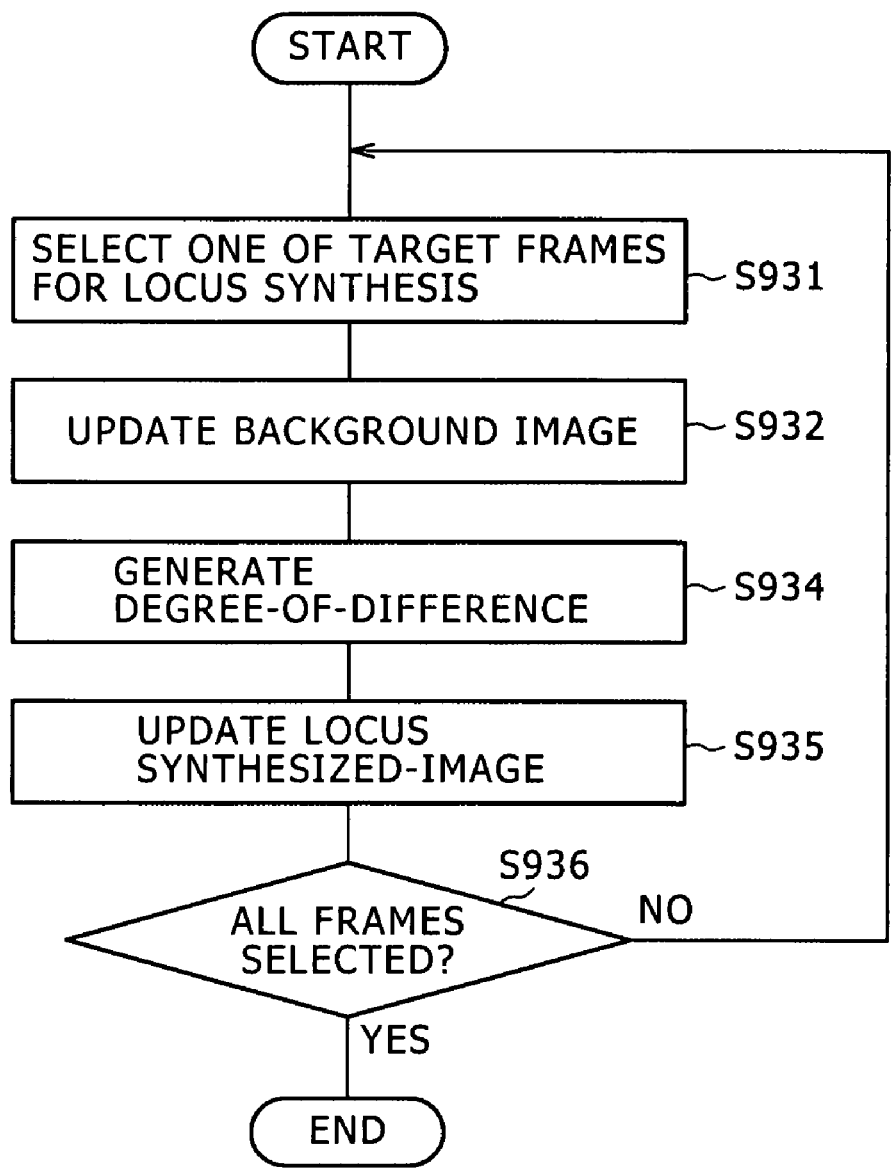
FIG. 22 is a flowchart showing one procedure of processing with the third example of the image processing circuit of the imaging apparatus according to the embodiment of the present invention.

FIG. 22 is a flowchart showing one procedure of the processing with the third example of the image processing circuit 23 of the imaging apparatus according to the embodiment of the present invention.

First, the frame as the target for locus synthesis is selected as the input image (Step S931). This processing is performed with the frame selection unit 220. Thereafter, background image is updated with the selected frame (Step S932). This processing is performed with the background generation unit 230.

Subsequently, the degree-of-difference between the background image and the input image is generated based on the background image and the input image (Step S934). This processing is performed with the degree-of-difference generation unit 240.

Subsequently, the locus synthesis image is updated based on the degree-of-difference (Step S935). This processing is performed with the locus synthesis unit 250.

The selection of all the frames as the targets for locus synthesis leads to termination of the processing, while the processing following the Step S931 is repeated in other cases (Step S936). The selection of the frames in the time series order in the Step S931 allows the locus synthesis to be provided in the time series order in the Step S935, followed by output of the locus synthesis result, permitting a locus moving image to be played back.

Figure 23:
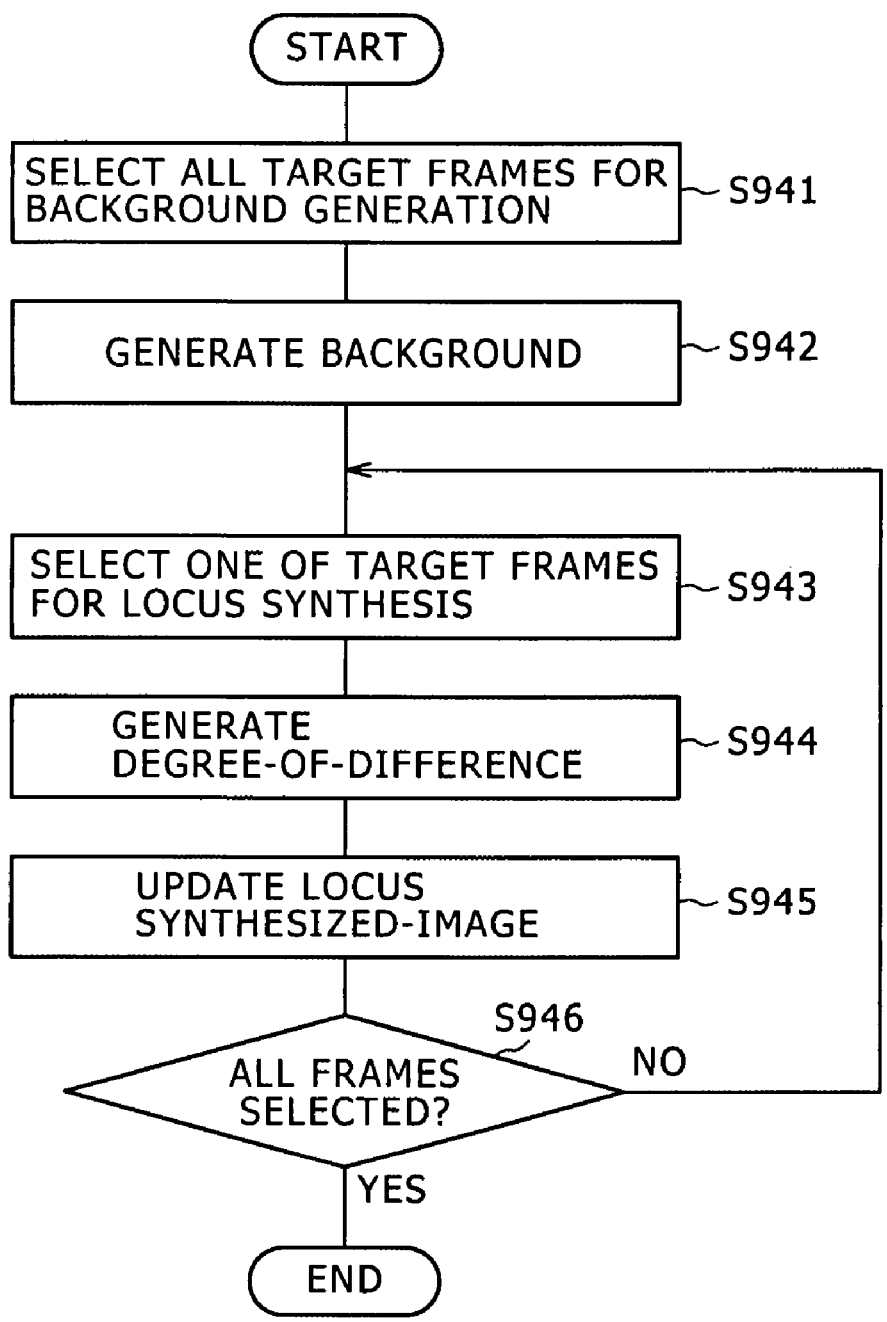
FIG. 23 is a flowchart showing one procedure of processing with the fourth example of the image processing circuit of the imaging apparatus according to the embodiment of the present invention.

FIG. 23 is a flowchart showing one procedure of the processing with the fourth example of the image processing circuit 23 of the imaging apparatus according to the embodiment of the present invention.

First, the frames as the targets for background generation are all selected (Step S941). This processing is performed with the background pixel frame selection unit 222. Then, the background image is generated with the selected frames (Step S942). This processing is performed with the background generation unit 231.

Subsequently, the frame as the target for locus synthesis is selected as the input image (Step S943). This processing is performed with the locus pixel frame selection unit 221. Then, the degree-of-difference between the background image and the input image is generated based on the background image and the input image (Step S944). This processing is performed with the degree-of-difference generation unit 240.

Subsequently, the locus-synthesized image is updated based on the degree-of-difference (Step S945). This processing is performed with the locus synthesis unit 250.

The selection of all the frames as the targets for locus synthesis leads to the termination of the processing, while the processing following the Step S943 is repeated in other cases (Step S946).

As described the above, according to one embodiment of the present invention, the still and/or moving image of the moving object locus may be generated by, after generating the degree-of-difference between each input image pixel value and the background image pixel value, reflecting the input image pixel values in the locus-synthesized image provided as the output image depending on the generated degree-of-difference.

While the above embodiments of the present invention have been described in relation to one configuration for generating the background image when (or immediately before) generating the locus-synthesized image, it may be appreciated that use of a preliminarily generated background image will do. For instance, like a modification shown in FIG. 24, the background image supplied to the degree-of-difference generation unit 240 after being held in the background image holding unit 261 is to be stored in a background image storage unit 206. Afterwards, in generating the locus-synthesized image, the background image stored in the background image storage unit 206 is restored, causing the restored background image to be held in the background image holding unit 261, without generation of the background image using the background generation unit 231.

This processing may eliminate the need to generate the background image for several times of attempts to generate the locus-synthesized image with respect to the same input image. The calculation for the background generation generally requires a higher cost, as compared with that for the generation of the locus-synthesized image, so that no need to generate the background image leads to significant effects. For instance, it is effective in cases such as in allowing the display unit 43 to play back the locus moving image relating to scenes to be played back after storage of more than one frame image provided by being taken continuously, the locus-synthesized image and the background image.

Figure 24:
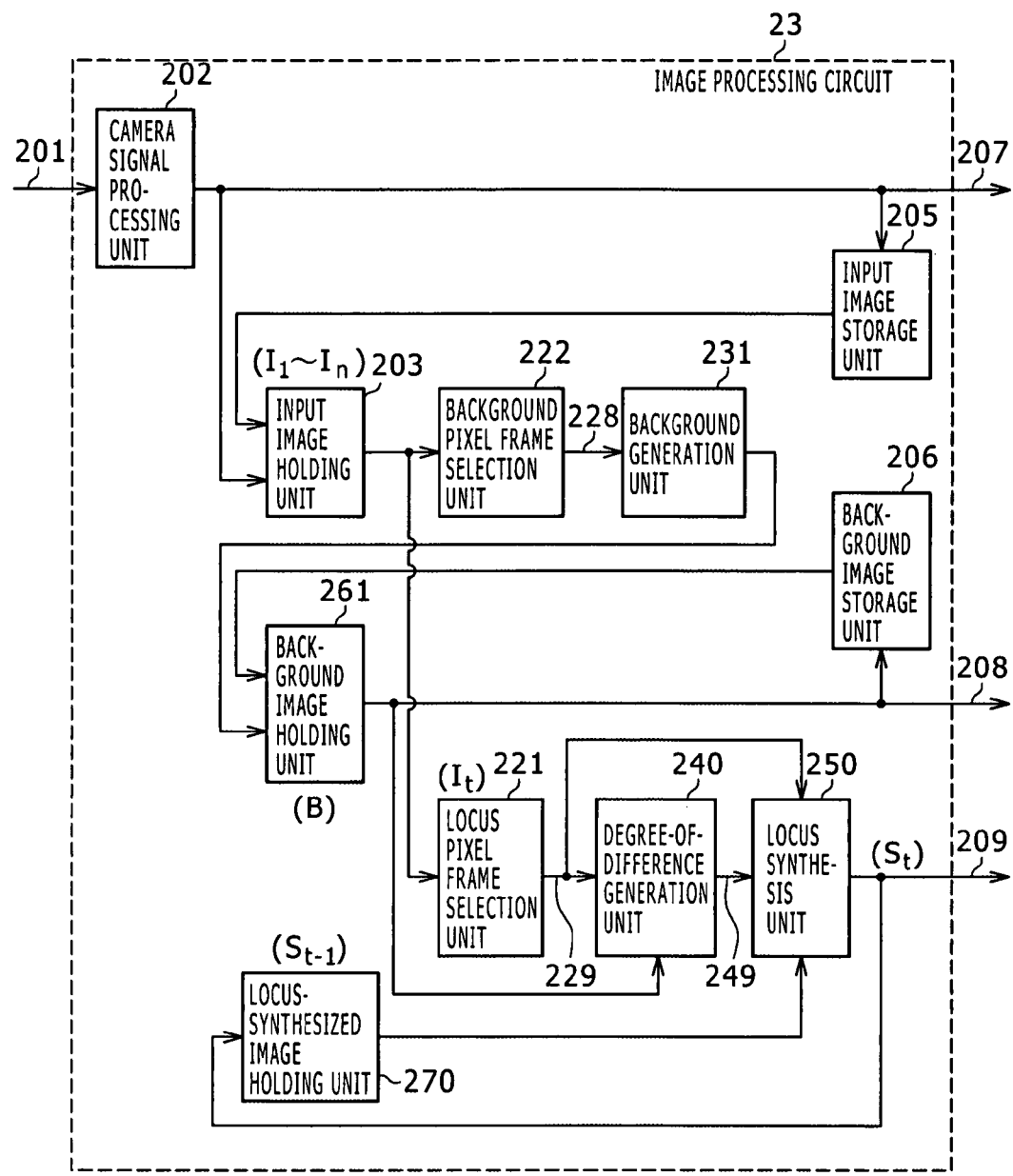
FIG. 24 is a block diagram showing a modification of the image processing circuit of the imaging apparatus according to the embodiment of the present invention.

The modification shown in FIG. 24 is the same as the fourth example shown in FIG. 20 in the configurations and operations of the locus pixel frame selection unit 221, the background pixel frame selection unit 222, the background generation unit 231, the background image holding unit 261, the degree-of-difference generation unit 240, the locus synthesis unit 250 and the locus-synthesized image holding unit 270. This modification is provided on the assumption that, upon receipt of the input image supplied from the A/D conversion circuit 22 through the signal line 201, the image processing circuit 23 is to be operated to supply the received input image, the background image and the locus-synthesized image to the post-staged unit such as the D/A conversion circuit 41 and the encoder/decoder 31 through the signal lines 207, 208 and 209.

A camera signal processing unit 202 is to give processing such as RGB simultaneous processing, color matrix processing and gamma processing to the input image provided by being converted into the digital signal by the A/D conversion circuit 22, followed by outputting the resultant input image. For normal image output, the resultant input image is outputted from the camera signal processing unit 202 through the signal line 207 without being converted.

An input image holding unit 203 is to hold the input image to be supplied to the locus pixel frame selection unit 221 and the background pixel frame selection unit 222. The n frames of input images (I1 to In) are herein supposed to be held, like the previously described fourth example. An input image storage unit 205 is to store the input image supplied from the camera signal processing unit 202. The input image holding unit 203 holds the supplied image from the camera signal processing unit 202 as the input image in a case where an image in process of being taken is used as the input image, or makes restoration of the stored image in the input image storage unit 205 as the input image before holding in a case where a past stored image is used as the input image.

The background image storage unit 206 is to store the background image held in the background image holding unit 261. The background image storage unit 206 makes temporary storage of the background image supplied from the background image holding unit 261 through the signal line 208. Afterwards, the background image stored in the background image storage unit 206 is restored at need and then held in the background image holding unit 261. Specifically, in generating the background image at the time when (or immediately before) generating the locus-synthesized image, the background image holding unit 261 holds the background image supplied from the background generation unit 231. On the other hand, in generating the locus-synthesized image using the past stored background image, the background image holding unit 261 makes the restoration of the background image stored in the background image storage unit 206 before holding.

The locus-synthesized image outputted from the locus synthesis unit 250 is held in the locus-synthesized image holding unit 270, and is also supplied to the post-staged unit such as the D/A conversion circuit 41 and the encoder/decoder 31 through the signal line 209.

Figure 25:
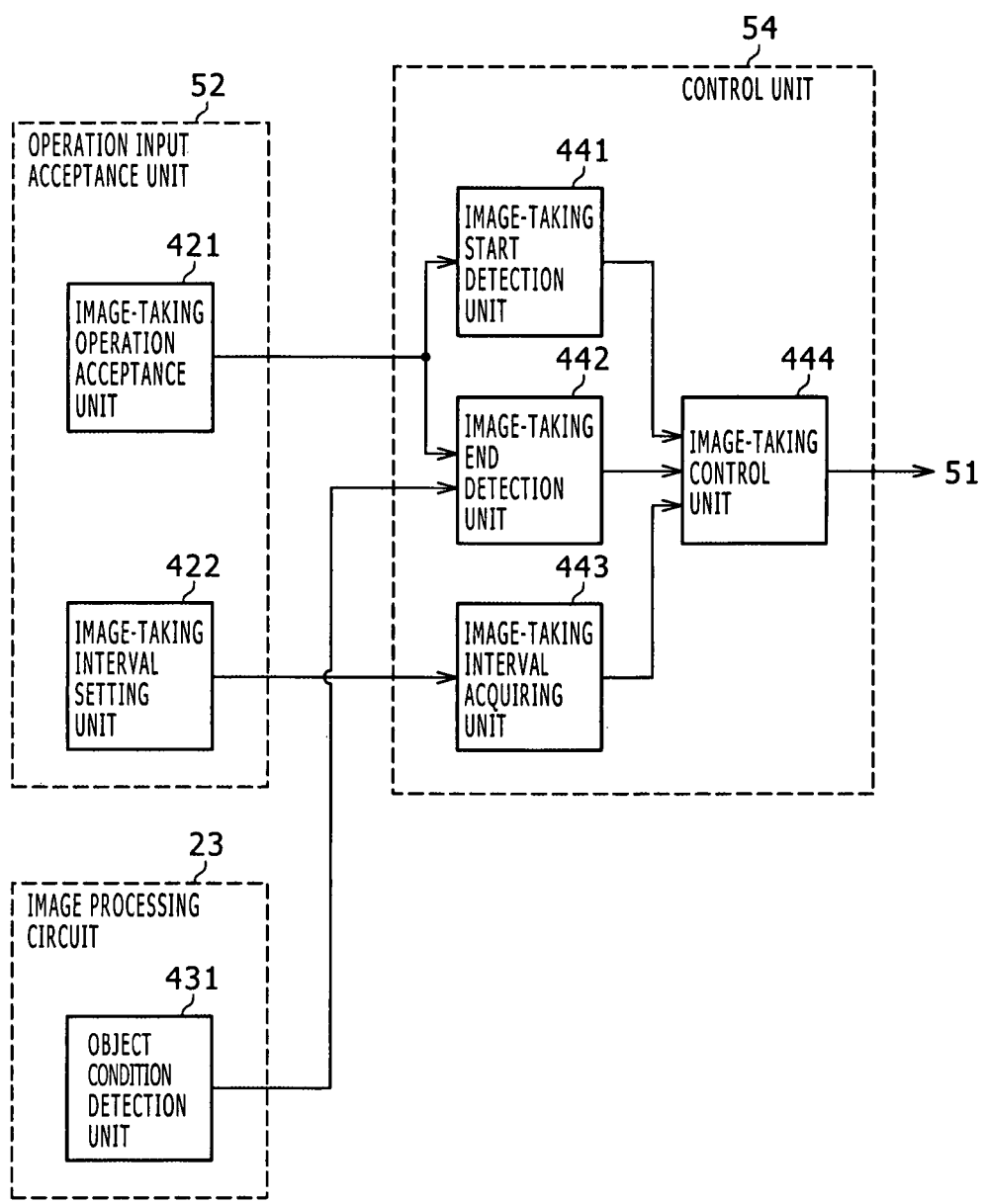
FIG. 25 is a block diagram showing one configuration related to operations of the imaging apparatus according to the embodiment of the present invention.

FIG. 25 shows one configuration related to the operations of the imaging apparatus according to the embodiment of the present invention. It is herein assumed that the operation input acceptance unit 52 includes an image-taking operation acceptance unit 421 and an image-taking interval setting unit 422, the image processing circuit 23 includes an object condition detection unit 431, and the control unit 54 includes an image-taking start detection unit 441, an image-taking end detection unit 442, an image-taking interval acquiring unit 443 and an image-taking control unit 444. These functions may be implemented using other circuits etc.

The image-taking operation acceptance unit 421 is to accept an image-taking operation given by the user, and corresponds to a unit such as the shutter button included in a digital still camera and a moving image-taking button included in a digital video camera, for instance. The image-taking interval setting unit 422 is to permit a temporal interval of each frame at the time of the image-taking operation to be set. The image-taking interval is to be used in a continuous image-taking mode, and is preset by the user or settled fixedly. The image-taking interval acquiring unit 443 is to acquire the image-taking interval provided by being set in the image-taking interval setting unit 422.

The object condition detection unit 431 is to detect the condition of the object contained in the input image. The object condition detection unit 431 generates the pixel-to-pixel difference on the temporally continuous input image frames, and then judges the object to be in a static condition if there is no pixel-to-pixel difference, or conversely, in a moving condition if there is the pixel-to-pixel difference.

The image-taking start detection unit 441 detects the occurrence of an image-taking start instruction based on the image-taking operation accepted in the image-taking operation acceptance unit 421. The image-taking end detection unit 442 detects the occurrence of an image-taking end instruction based on the image-taking operation accepted in the image-taking operation acceptance unit 421. As for a normal continuous image-taking mode, for instance, the occurrence of an action of pushing down the shutter button involves the image-taking start, while a release from the action of pushing down the shutter button involves the image-taking end.

Further, continuous image-taking control is also executable by giving attention to the condition of the object. For instance, it is allowable to give control so as to provide the image-taking end if the object is judged to be in the static condition by the object condition detection unit 431, with the shutter button pushed down.

The image-taking control unit 444 is to control the timing generator 51 so as to provide a continuous image-taking operation at the image-taking interval acquired by the image-taking interval acquiring unit 443, during a period from the detection of the image-taking start by the image-taking start detection unit 441 to the detection of the image-taking end by the image-taking end detection unit 442.

Figure 26:
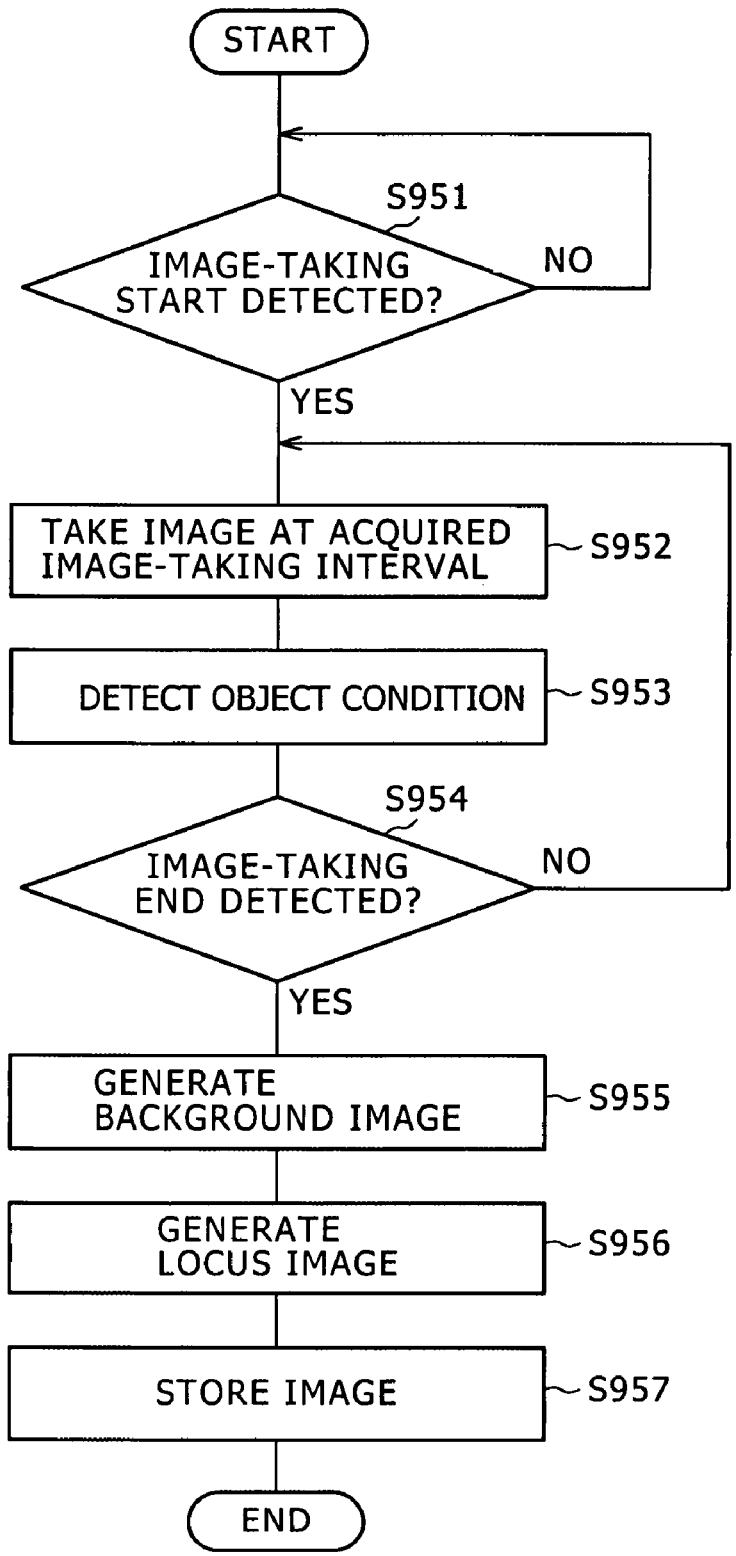
FIG. 26 is a flowchart showing one procedure of processing when effecting an image-taking operation with the imaging apparatus according to one embodiment of the present invention.

FIG. 26 is a flowchart showing one procedure of the processing when effecting the image-taking operation with the imaging apparatus according to one embodiment of the present invention. The image-taking start is detected with the image-taking start detection unit 441 (Step S951), followed by effecting of the image-taking operation at the image-taking interval acquired by the image-taking interval acquiring unit 443 (Step S952). This image-taking step is repeated until the image-taking end is detected with the image-taking end detection unit 442 (Step S954). During this processing, the condition of the object is detected with the object condition detection unit 431 (Step S953).

In a case where the image-taking operation acceptance unit 421 provides acceptance of the release from the action of pushing down the shutter button, and/or the object condition detection unit 431 provides the detection of the object to be in the static condition, the image-taking end is detected (Step S954).

Upon the end of the image-taking operation, the background image is generated in the background generation unit 231 (Step S955). Specifically, all the frames as the targets for background generation are selected as shown in FIG. 23 (Step S941), followed by a step (Step S942) of generating the background image with the selected frames.

Then, the locus-synthesized image is generated with the locus synthesis unit 250 (Step S956). Further, the input image and the background image are stored in the input image storage unit 205 and the background image storage unit 206, respectively (Step S957).

Figure 27:
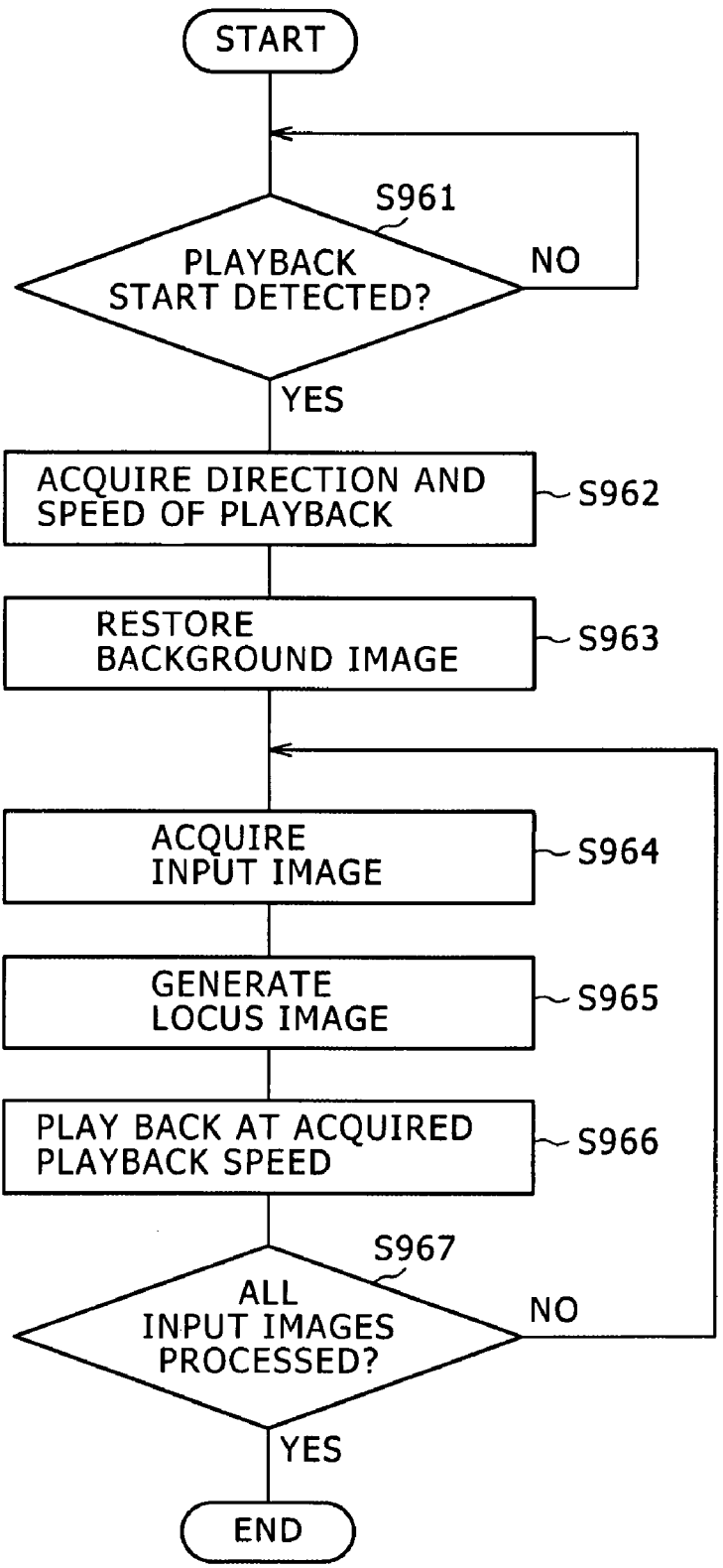
FIG. 27 is a flowchart showing one procedure of processing when effecting a playback operation with the imaging apparatus according to one embodiment of the present invention.

FIG. 27 is a flowchart showing one procedure of the processing when effecting a playback operation with the imaging apparatus according to the embodiment of the present invention. A playback start instruction given through the operation input acceptance unit 52 is detected (Step S961), followed by acquisition of a direction and a speed of playback (Step S962). The direction and the speed of playback are to be accepted with the operation input acceptance unit 52. For instance, the operation input acceptance unit 52 may include a forward playback button, a reverse playback button and a fast forward button etc. are assumed.

In a case where the background image is stored in the Step S957, the background image is restored from the background image storage unit 206 and is then held in the background image holding unit 261 (Step S963). Further, after the restoration of the input image from the input image storage unit 205, the input image is held in the input image holding unit 203, followed by acquisition of the input image from the input image holding unit 203 in the time series order in the playback direction, acquired in the Step S962 (Step S964). This processing permits the locus-synthesized image to be generated in the locus synthesis unit 250 (Step S965), followed by effecting of the playback operation at the playback speed acquired in the Step S962 (Step S966). The processing of the Steps from S964 to S966 is repeated on all the taken images relating to the target scenes (Step S967).

While the above embodiments of the present invention have been described in relation to one mode for implementing the image processing relevant to the imaging apparatus with the circuits, the contents of the above image processing may be implemented with software. Specifically, the procedures of the processing having been described in the above embodiments of the present invention may be understood as a method having a series of the above steps, or alternatively, as a program adapted for a computer to perform the series of the above steps or a recording medium used to store the program. Alternatively, the present invention is not limited to the image processing circuit integrated with the imaging apparatus, and an implementation in the form of an independent image processing apparatus may be also made. Further, the present invention also allows for integration into an image reproducing apparatus and/or a mobile apparatus.

While the above embodiments of the present invention have been described as related to one instance to embody the present invention, and respectively provide correspondences with specific matters of the present invention involved in claims as follows, the present invention is not limited to the above correspondences, and various changes and modifications may be made in the present invention without departing from the spirit and scope thereof.

Specifically, in a claim, background generation means, degree-of-difference generation means and output image generation means respectively correspond to the background generation unit 130, the degree-of-difference generation unit 140 and the locus synthesis unit 150, for instance.

Further, in a claim, background pixel value holding means, occurrence-of-frequency holding means and reference value setting means respectively correspond to the background value holding unit 138, the background frequency holding unit 137 and the reference value setting unit 133, for instance. Further, background candidate generation means corresponds to the background determination unit 134 and the background value calculation unit 135, and update determination means corresponds to the update determination unit 136 and the background frequency counter 1361, for instance.

Furthermore, in a claim, output image holding means, synthesis ratio generation means and synthesis value calculation means respectively correspond to the locus synthesis value holding unit 153, the locus synthesis ratio generation unit 151 and the locus synthesis value calculation unit 152, for instance.

Furthermore, in a claim, output image holding means, frame number holding means and update determination means respectively correspond to the locus synthesis value holding unit 156, the latest frame number holding unit 155 and the update determination unit 154, for instance.

Furthermore, in a claim, output image holding means, degree-of-difference holding means and update determination means respectively correspond to the locus synthesis value holding unit 156, the maximum degree-of-difference holding unit 158 and the update determination unit 157, for instance.

Furthermore, in a claim, image selection means, background generation means, degree-of-difference generation means and output image generation means respectively correspond to the background image selection unit 122, the background generation unit 130, the degree-of-difference generation unit 140 and the locus synthesis unit 150, for instance.

Furthermore, in a claim, background image holding means, output image holding means, background generation means, degree-of difference generation means and output image synthesis means respectively correspond to the background image holding unit 260, the locus-synthesized image holding unit 270, the background generation unit 230, the degree-of-difference generation unit 240 and the locus synthesis unit 250, for instance.

Furthermore, in a claim, image selection means, background generation means, background image holding means, output image holding means, degree-of-difference generation means and output image synthesis means respectively correspond to the background pixel frame selection unit 222, the background generation unit 231, the background image holding unit 261, the locus-synthesized image holding unit 270, the degree-of-difference generation unit 240 and the locus synthesis unit 250, for instance.

Furthermore, in a claim, a step of generating, on each of corresponding pixel positions of more than one input image, a pixel value involved in a predetermined distribution among pixel values of the input images as a background pixel value in the above pixel position; a step of generating, on each of the pixel positions, a degree-of-difference indicating a degree to which each input image pixel value has a difference from the background pixel value; and a step of generating, on each of the pixel positions, an output image pixel value by reflecting the input image pixel values depending on the degree-of-difference respectively correspond to the Steps S912, S914 and S915, for instance.

Furthermore, in a claim, a step of selecting a predetermined number of input images as selected images from more than one input image; a step of generating, on each of corresponding pixel positions of the selected images, a pixel value involved in a predetermined distribution among pixel values of the selected images as a background pixel value in the above pixel position; a step of generating, on each of the pixel positions, a degree-of-difference indicating a degree to which each input image pixel value has a difference from the background pixel value; and a step of generating, on each of the pixel positions, an output image pixel value by reflecting the input image pixel values depending on the degree-of-difference respectively correspond to the Steps S911, S912, S914 and S915, for instance.

Furthermore, in a claim, background image holding means and output image holding means respectively correspond to the background image holding unit 260 and the locus-synthesized image holding unit 270, for instance. Further, in the claim, a step of updating the background image pixel value held in the background image holding means based on a predetermined ratio and with pixel values in corresponding pixel positions of input images allowed to enter in time series; a step of generating a degree-of-difference indicating a degree to which each input image pixel value has a difference from the pixel value in the corresponding pixel position of the updated background image provided by the background generation means; and a step of synthesizing, on the output image pixel value, the pixel values in the corresponding pixel positions of the input images depending on the degree-of-difference respectively correspond to the Steps S932, S934 and S935, for instance.

Furthermore, in a claim, background image holding means and output image holding means respectively correspond to the background image holding unit 261 and the locus-synthesized image holding unit 270, for instance. Further, in the claim, a step of selecting a predetermined number of input images as selected images from more than one input image and a step of generating, on each of corresponding pixel positions of the selected images, a pixel value involved in a predetermined distribution among pixel values of the selected images as a pixel value in a corresponding pixel position of a background image, causing the generated pixel value to be held in the background image holding means respectively corresponds to the Steps S941 and S942, for instance. Further, in the claim, a degree-of-difference generation step and an output image synthesis step respectively correspond to the Steps S944 and S945, for instance.

Furthermore, in a claim, image selection means, background generation means, background image holding means, output image holding means, degree-of-difference generation means, output image synthesis means and background image storage means respectively correspond to the background pixel frame selection unit 222, the background generation unit 231, the background image holding unit 261, the locus-synthesized image holding unit 270, the degree-of-difference generation unit 240, the locus synthesis unit 250 and the background image storage unit 206, for instance.

Furthermore, in a claim, background image holding means, background image storage means and output image holding means respectively correspond to the background image holding unit 261, the background image storage unit 206 and the locus-synthesized image holding unit 270, for instance. Further, in the claim, a step of selecting a predetermined number of input images as selected images from more than one input image; a step of generating, on each of corresponding pixel positions of the selected images, a pixel value involved in a predetermined distribution among pixel values of the selected images as a pixel value in a corresponding pixel position of a background image, causing the generated pixel value to be held in the background image holding means; a step of causing the background image held in the background image holding means to be stored in the background image storage means; and a step of causing the background image stored in the background image storage means to be restored and held in the background image holding means respectively correspond to the Steps S941, S942, S957 and S963 for instance. Further, in the claim, a degree-of-difference generation step and an output image synthesis step respectively equal to the Steps S944 and S945, for instance.

CROSS REFERENCES TO RELATED APPLICATIONS

The present document contains subject matter related to Japanese Patent Applications JP 2006-129092 and JP 2006-193435 filed in the Japanese Patent Office on May 8, 2006 and Jul. 13, 2006, respectively, the entire contents of which being incorporated herein by reference.

What is claimed is:

1. An image processing apparatus including a computer, comprising:
   a background generator for generating, on each of corresponding pixel positions of more than one input image, a pixel value involved in a predetermined distribution among pixel values of the input images as a background pixel value in the pixel position;
   a degree-of-difference generator for generating, on each of the pixel positions, a degree-of-difference indicating a degree to which each input image pixel value has a difference from the background pixel value; and a locus synthesizer for generating, on each of the pixel positions, an output image pixel value by reflecting the input image pixel values depending on the degree-of-difference, wherein the background generator includes a frequency-of-occurrence holder for holding a frequency-of-occurrence of the background pixel value.

2. The image processing apparatus according to claim 1, wherein the background generator generates a most frequently occurring pixel value as the pixel value involved in the predetermined distribution.

3. The image processing apparatus according to claim 2, wherein the background generator includes:
   a background pixel value holder for holding the background pixel value;
   a reference value setter for setting a reference value for the input image pixel values;
   a background determiner for determining, as a background candidate value, the input image pixel value that falls in a predetermined range of difference from the reference value; and
   an update determiner for, after counting the frequency-of-occurrence of the background candidate value, making updating so as to cause the frequency-of-occurrence of the background candidate value to be held in the frequency-of-occurrence holder, and also, the background candidate value to be held as a latest background pixel value in the background pixel value holder in a case where the frequency-of-occurrence of the background candidate value is greater than the frequency-of-occurrence held in the frequency-of-occurrence holder.

4. The image processing apparatus according to claim 1, wherein the locus synthesizer includes:
   a locus synthesis value holder for holding the output image pixel value;
   a synthesis ratio generator for generating, on each of the pixel positions, a synthesis ratio depending on the degree-of-difference; and
   a synthesis value calculator for calculating, on each of the pixel positions, the input image pixel values with the output image pixel value held in the locus synthesis value holder depending on the synthesis ratio, causing a synthesis result to be held as a latest output image pixel value in the locus synthesis value holder.

5. The image processing apparatus according to claim 1, wherein the locus synthesizer includes:
   a locus synthesis value holder for holding the output image pixel value;
   a frame number holder for holding a frame number of the output image; and
   an update determiner for causing an input image frame number to be held in the frame number holder, and also, the input image pixel value to be held as a latest output image pixel value in the locus synthesis value holder in a case where the frame number of the input image is more up-to-date in time series than the frame number held in the frame number holder, provided that the degree-of-difference given is not less than a predetermined degree.

6. The image processing apparatus according to claim 1, wherein the locus synthesizer includes:
   a locus synthesis value holder for holding the output image pixel value;
   a degree-of-difference holder for holding the degree-of-difference on said output image; and
   an update determiner for causing the degree-of-difference on the input image to be held in the degree-of-difference holder, and also, the input image pixel value to be held as a latest output image pixel value in the locus synthesis value holder in a case where the degree-of-difference on the input image is greater than the degree-of-difference held in the degree-of-difference holder.

7. An image processing apparatus including a computer, comprising:
   an image selector for selecting a predetermined number of input images as selected images from more than one input image;
   a background generator for generating, on each of corresponding pixel positions of the selected images, a pixel value involved in a predetermined distribution among pixel values of the selected images as a background pixel value in the pixel position;
   a degree-of-difference generator for generating, on each of the pixel positions, a degree-of-difference indicating a degree to which each input image pixel value has a difference from the background pixel value; and
   a locus synthesizer for generating, on each of the pixel positions, an output image pixel value by reflecting the input image pixel values depending on the degree-of-difference,
   wherein the background generator includes a frequency-of-occurrence holder for holding a frequency-of-occurrence of the background pixel value.

8. An image processing apparatus including a computer, comprising:
   a background image holder for holding a background image pixel value;
   a locus synthesis value holder for holding an output image pixel value;
   a background generator for updating the background image pixel value held in the background image holder based on a predetermined ratio and with pixel values in corresponding pixel positions of input images allowed to enter in time series;
   a degree-of-difference generator for generating a degree-of-difference indicating a degree to which each input image pixel value has a difference from the pixel value in the corresponding pixel position of the updated background image provided by the background generator; and
   a locus synthesizer for synthesizing, on the output image pixel value, the pixel values in the corresponding pixel positions of the input images depending on the degree-of-difference, causing a synthesis result to be held as a latest output image pixel value in the locus synthesis value holder,
   wherein the background generator includes a frequency-of-occurrence holder for holding a frequency-of-occurrence of the background image pixel value.

9. An image processing apparatus including a computer, comprising:
   an image selector for selecting a predetermined number of input images as selected images from more than one input image;
   a background generator for generating, on each of corresponding pixel positions of the selected images, a pixel value involved in a predetermined distribution among pixel values of the selected images as a pixel value in a corresponding pixel position of a background image;
   a background image holder for holding the background image pixel value;
   a locus synthesis value holder for holding an output image pixel value;

a degree-of-difference generator for generating a degree-of-difference indicating a degree to which each input image pixel value has a difference from the corresponding pixel value of the background image held in the background image holder; and a locus synthesizer for synthesizing, on the output image pixel value, the pixel values in the corresponding pixel positions of the input images depending on the degree-of-difference, causing a synthesis result to be held as a latest output image pixel value in the locus synthesis value holder, wherein the background generator includes a frequency-of-occurrence holder for holding a frequency-of-occurrence of the background image pixel value.

10. An image processing method, comprising:

a step of generating, using a computer, on each of corresponding pixel positions of more than one input image, a pixel value involved in a predetermined distribution among pixel values of the input images as a background pixel value in the pixel position;

a step of holding a frequency-of-occurrence of the background pixel value in a frequency-of-occurrence holder;

a step of generating, using the computer, on each of the pixel positions, a degree-of-difference indicating a degree to which each input image pixel value has a difference from the background pixel value; and a step of generating, using the computer, on each of the pixel positions, an output image pixel value by reflecting the input image pixel values depending on the degree-of-difference.

11. An image processing method, comprising:

a step of selecting, using a computer, a predetermined number of input images as selected images from more than one input image;

a step of generating, using the computer, on each of corresponding pixel positions of the selected images, a pixel value involved in a predetermined distribution among pixel values of the selected images as a background pixel value in the pixel position;

a step of holding a frequency-of-occurrence of the background pixel value in a frequency-of-occurrence holder;

a step of generating, using the computer, on each of the pixel positions, a degree-of-difference indicating a degree to which each input image pixel value has a difference from the background pixel value; and a step of generating, using the computer, on each of the pixel positions, an output image pixel value by reflecting the input image pixel values depending on the degree-of-difference.

12. An image processing method applied to an image processing apparatus having a background image holder for holding a background image pixel value, a frequency-of-occurrence holder for holding a frequency-of-occurrence of the background image pixel value, and an output image holder for holding an output image pixel value, the image processing method comprising:

a step of updating, using a it computer, the background image pixel value held in the background image holder based on a predetermined ratio and with pixel values in corresponding pixel positions of input images allowed to enter in time series;

a step of generating, using the computer, a degree-of-difference indicating a degree to which each input image pixel value has a difference from the pixel value in the corresponding pixel position of the updated background image provided by a background generator; and a step of synthesizing, using the computer, on the output image pixel value, the pixel values in the corresponding pixel positions of said input images depending on said degree-of-difference, causing a synthesis result to be held as a latest output image pixel value in the output image holder;

wherein the steps are repeated every time enter of the input images reoccurs.

13. An image processing method applied to an image processing apparatus having a background image holder for holding a background image pixel value, a frequency-of-occurrence holder for holding a frequency-of-occurrence of the background image pixel value, and an output image holder for holding an output image pixel value, the image processing method comprising:

a step of selecting, using a computer, a predetermined number of input images as selected images from more than one input image;

a step of generating, using the computer, on each of corresponding pixel positions of the selected images, a pixel value involved in a predetermined distribution among pixel values of the selected images as a pixel value in a corresponding pixel position of the background image, causing the generated pixel value to be held in the background image holder;

a degree-of-difference generation step of generating, using the computer, a degree-of-difference indicating a degree to which each input image pixel value has a difference from the corresponding pixel value of the background image held in the background image holder; and an output image synthesis step of synthesizing, using the computer, on the output image pixel value, the pixel values in the corresponding pixel positions of the input images depending on the degree-of-difference, causing a synthesis result to be held as a latest output image pixel value in the output image holder;

wherein the degree-of-difference generation step and the output image synthesis step are repeated every time enter of the input images reoccurs.

14. A computer-readable medium storing a computer program for causing a computer to perform steps comprising:

generating, on each of corresponding pixel positions of more than one input image, a pixel value involved in a predetermined distribution among pixel values of the input images as a background pixel value in the pixel position;

holding a frequency-of-occurrence of the background pixel value in a frequency-of-occurrence holder;

generating, on each of the pixel positions, a degree-of-difference indicating a degree to which each input image pixel value has a difference from the background pixel value; and generating, on each of the pixel positions, an output image pixel value by reflecting the input image pixel values depending on the degree-of-difference.

15. A computer-readable medium storing a computer program for causing a computer to perform steps comprising:

selecting a predetermined number of input images as selected images from more than one input image;

generating, on each of corresponding pixel positions of the selected images, a pixel value involved in a predetermined distribution among the pixel values of the selected images as a background pixel value in the pixel position;

holding a frequency-of-occurrence of the background pixel value in a frequency-of-occurrence holder;

generating, on each of the pixel positions, a degree-of-difference indicating a degree to which each input image pixel value has a difference from the background pixel value; and generating, on each of the pixel positions, an output image pixel value by reflecting the input image pixel values depending on the degree-of-difference.

16. A computer-readable medium storing a computer program, applied to an image processing apparatus having a background image holder for holding a background image pixel value, a frequency-of-occurrence holder for holding a frequency-of-occurrence of the background image pixel value, and an output image holder for holding an output image pixel value, the computer program causing a computer to perform steps comprising:

updating the background image pixel value held in the background image holder based on a predetermined ratio and with pixel values in corresponding pixel positions of input images allowed to enter in time series;

generating a degree-of-difference indicating a degree to which each input image pixel value has a difference from the pixel value in the corresponding pixel position of the updated background image provided by a background generator; and synthesizing, on the output image pixel value, the pixel values in the corresponding pixel positions of the input images depending on the degree-of-difference, causing a synthesis result to be held as a latest output image pixel value in the output image holder;

wherein the computer is adapted to repeat the steps every time enter of the input images reoccurs.

17. A computer-readable medium storing a computer program, applied to an image processing apparatus having a background image holder for holding a background image pixel value, a frequency-of-occurrence holder for holding a frequency-of-occurrence of the background image pixel value, and an output image holder for holding an output image pixel value, the computer program causing a computer to perform steps comprising:

selecting a predetermined number of input images as selected images from more than one input image;

generating, on each of corresponding pixel positions of the selected images, a pixel value involved in a predetermined distribution among pixel values of said selected images as a pixel value in a corresponding pixel position of the background image, causing the generated pixel value to be held in the background image holder;

generating a degree-of-difference indicating a degree to which each input image pixel value has a difference from the corresponding pixel value of the background image held in the background image holder; and synthesizing, on the output image pixel value, the pixel values in the corresponding pixel positions of the input images depending on the degree-of-difference, causing a synthesis result to be held as a latest output image pixel value in the output image holder;

wherein the computer is adapted to repeat the degree-of-difference generation step and the output image synthesis step every time enter of the input images reoccurs.

18. An image processing apparatus including a computer, comprising:

an image selector for selecting a predetermined number of input images as selected images from more than one input image;

a background generator for generating, on each of corresponding pixel positions of the selected images, a pixel value involved in a predetermined distribution among pixel values of the selected images as a pixel value in a corresponding pixel position of a background image;

a background image holder for holding the background image pixel value;

a locus synthesis value holder for holding an output image pixel value;

a degree-of-difference generator for generating a degree-of-difference indicating a degree to which each input image pixel value has a difference from the corresponding pixel value of the background image held in the background image holder;

a locus synthesizer for synthesizing, on the output image pixel value, the pixel values in the corresponding pixel positions of the input images depending on the degree-of-difference, causing a synthesis result to be held as a latest output image pixel value in the locus synthesis value holder; and a background image storer for storing the background image pixel value held in the background image holder;

wherein the background image holder makes restoration of the background image stored in the background image storer before holding, in a case where a required background image is contained in the background image storer.

19. An image processing method applied to an image processing apparatus having a background image holder for holding a background image pixel value, a background image storer for storing the background image held in the background image holder, and an output image holder for holding an output image pixel value, the image processing method comprising:

a step of selecting, using a computer, a predetermined number of input images as selected images from more than one input image;

a step of generating, using the computer, on each of corresponding pixel positions of the selected images, a pixel value involved in a predetermined distribution among pixel values of the selected images as a pixel value in a corresponding pixel position of the background image, causing the generated pixel value to be held in the background image holder;

a step of causing, using the computer, the background image held in the background image holder to be stored in the background image storer;

a step of causing, using the computer, the background image stored in the background image storer to be restored and held in the background image holder;

a degree-of-difference generation step of generating, using the computer, a degree-of-difference indicating a degree to which each input image pixel value has a difference from the corresponding pixel value of the background image held in the background image holder; and an output image synthesis step of synthesizing, using the computer, on the output image pixel value, the pixel values in the corresponding pixel positions of the input images depending on the degree-of-difference, causing a synthesis result to be held as a latest output image pixel value in the output image holder;

wherein the degree-of-difference generation step and the output image synthesis step are repeated every time enter of the input images reoccurs.

20. A computer-readable medium storing a computer program, applied to an image processing apparatus having a background image holder for holding a background image pixel value, a background image storage unit storer for storing the background image held in the background image holder, and an output image holder for holding an output image pixel value, the computer program causing a computer to perform steps comprising:

selecting a predetermined number of input images as selected images from more than one input image;

generating, on each of corresponding pixel positions of the selected images, a pixel value involved in a predetermined distribution among pixel values of the selected images as a pixel value in a corresponding pixel position of the background-image, causing the generated pixel value to be held in the background image holder;

causing the background image held in the background image holder to be stored in the background image storer;

causing the background image stored in the background image storer to be restored and held in the background image holder;

generating a degree-of-difference indicating a degree to which each input image pixel value has a difference from the corresponding pixel value of the background image held in the background image holder; and synthesizing, on the output image pixel value, the pixel values in the corresponding pixel positions of the input images depending on the degree-of-difference, causing a synthesis result to be held as a latest output image pixel value in the output image holder;

wherein the computer is adapted to repeat the degree-of-difference generation step and the output image synthesis step every time enter of the input images reoccurs.

* * * * *